(12) United States Patent
Johnson et al.

(10) Patent No.: US 11,347,565 B1
(45) Date of Patent: May 31, 2022

(54) SYSTEM AND METHOD FOR APP-TO-APP CONTENT RECONFIGURATION

(71) Applicant: UIPCO, LLC, San Antonio, TX (US)

(72) Inventors: Nathan Ryan Johnson, Celina, TX (US); Julia Beatrice Isaac, Plano, TX (US); Isidoro Garcia, San Antonio, TX (US); Nathaniel Brett Wiatrek, Houston, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/364,261

(22) Filed: Jun. 30, 2021

(51) Int. Cl.
*G06F 3/00* (2006.01)
*G06F 9/54* (2006.01)

(52) U.S. Cl.
CPC .................................. *G06F 9/54* (2013.01)

(58) Field of Classification Search
CPC ................................... G06F 9/54; G06F 3/04
USPC ........................................................ 719/310
See application file for complete search history.

(56) References Cited

U.S. PATENT DOCUMENTS

| 10,599,756 | B1 * | 3/2020 | Mirho | G06F 3/0482 |
| 2014/0268187 | A1 * | 9/2014 | Nichols | G06T 11/206 |
| | | | | 345/440 |
| 2014/0285717 | A1 * | 9/2014 | Cai | H04N 7/025 |
| | | | | 348/571 |
| 2019/0035122 | A1 * | 1/2019 | Oobuchi | G06K 9/628 |
| 2020/0077483 | A1 * | 3/2020 | Agarwal | H05B 47/175 |
| 2020/0356227 | A1 * | 11/2020 | Circlaeys | G06F 3/0484 |
| 2020/0379631 | A1 * | 12/2020 | Karlsson | G06F 16/74 |
| 2021/0142827 | A1 * | 5/2021 | Allen | G11B 27/034 |

OTHER PUBLICATIONS

Rodrigo, A Pattern-Based Approach for GUI Modeling and Testing. (Year: 2013).*

* cited by examiner

*Primary Examiner* — Lechi Truong
(74) *Attorney, Agent, or Firm* — Plumsea Law Group, LLC

(57) ABSTRACT

A method and system of providing users with a tool to interact with content from a primary app through a secondary app are disclosed. The secondary app obtains source data from the primary app and determines whether the data includes labels that can trigger the application of a particular configuration in the presentation of the content. Changes made to the source data in the secondary app that relate to substantive or key data for the content do not affect the source data in the primary app. However, changes made in the secondary app that relate to non-substantive data can be propagated back to the primary app.

20 Claims, 18 Drawing Sheets

264

LAB EFFECT OPTIONS

APPEARANCE
(E.G., TEMPLATE)
 COLOR
 SHAPE
 FONT
 SIZE
 OUTLINE
 FORMAT

HOVER FUNCTION

CLICK FUNCTION

DRAG DROP FUNCTION

READ-ONLY FIELDS

LOCK FUNCTION

WORKFLOW

HIDE FIELD

SHOW FIELD

PASSWORD PROTECTION

SECURITY RESTRICTIONS

IMAGE LIBRARY <____>

SLIDESHOW

AUDIO LIBRARY <____>

PRIORITY

DOTNET COMMUNITY TEAM

| FEATURES | ITERATION 1.1<br>6/22/21 - 7/5/21<br>CAP: 3/4 ✓ | ITERATION 1.2<br>7/6/21 - 7/19/21<br>CAP: 3/4 ✓ | ITERATION 1.3<br>7/20/21 - 8/2/21<br>CAP: 0/0 ⚠ |
|---|---|---|---|
| NET-95 IMPLEMENT NEW FXN | CREATE PROJECT IN SOURCE CONTROL | ADD SERVICE ACCOUNT ① | REQUEST ACCESS GROUP FOR SERVICE |

NET-97

TITLE: ADD SERVICE ACCOUNT
PRIORITY: MEDIUM

POINTS: 1

ASSIGNEE:
COMPONENT:
FIX VERSION:
DESCRIPTION: NEED TO CREATE SERVICE ACCOUNT
ACCEPTANCE CRITERIA: REQUEST IS SUBMITTED TO CREATE SERVICE ACCOUNT
LABELS: AUTOMATION, PI1.2, COLOR-RED

IDENTIFY MISSING FXN

ADD FEATURE: DROP STORIES HERE TO ADD THEM TO THE BOARD

BACKLOG (COLLAPSE)

FIG. 10

| ▤⌂ DOTNET COMMUNITY TEAM ▯ | | |
|---|---|---|
| FEATURES | ITERATION 1.1<br>6/22/21 - 7/5/21<br>CAP: 3/4 ✓ | ITERATION 1.2<br>7/6/21 - 7/19/21<br>CAP: 3/4 ✓ |
| NET-95:<br>IMPLEMENT<br>NEW FXN | CREATE<br>PROJECT<br>IN SOURCE<br>CONTROL ② | CREATE MEMBER<br>ACCOUNT ① |
| NET-99:<br>START<br>PROJECT 1 | SPIKE 1 ⓪<br>SPIKE 2 ⓪ | BUG 1 ⓪ |

FIG. 12C

SYSTEM AND METHOD FOR APP-TO-APP CONTENT RECONFIGURATION

TECHNICAL FIELD

The embodiments relate generally to methods and systems for sharing content between software applications, and specifically to adjusting the presentation of content provided to a user based on labels associated with the content.

BACKGROUND

User interfaces for APIs (application programming interfaces) can be used to facilitate an end user's interaction with, for example, a distributed computing environment (e.g., a web-based application), or an application residing wholly on a single computer system (e.g., a stand-alone application). Some APIs represent platforms for use by large-scale commercial or business enterprises. In such cases, the platform is supported by a complex and distributed environment and may offer users access to a wide range of functionalities. For example, companies may rely on issue tracking and project management applications that serve as a shared resource for employees to develop, review, and track their projects.

However, in some cases, the available software is insufficient or otherwise does not provide the desired functionality or features with respect to the content managed by the project software. For example, a user may wish to incorporate a content item into a task that has traditionally been performed manually (i.e., on paper or otherwise non-digitally), and be limited to features provided by the platform. Such software shortcomings have become increasingly evident as employees shift from on-site or in-person meetings to remote communications. The absence of a fluid, flexible tool for interacting with the selected content can lead to delays, frustration, and a continued disadvantageous reliance on physical resources and shared spaces. In addition, as not all employees will be able to travel to the site of an event, the output of these in-person meetings will inevitably discount the inputs submitted by remote attendees. Thus, the available planning tools can be impractical for real-world users who are remotely engaging with the platform day-to-day.

There is a need in the art for a system and method that addresses the shortcomings discussed above.

SUMMARY

In one aspect, a method of customizing a configuration of a content item in a secondary app is disclosed. The method includes a first step of obtaining, from a primary app and at the secondary app, a first content item, and a second step of detecting, at the secondary app, at least a first label associated with the first content item. In addition, a third step includes determining, at the secondary app and based on the first label, that a first configuration should be applied to any asset corresponding to first content item. In such cases, the first configuration implements a first policy conforming to instructions associated with the first label. The method further includes a fourth step of generating, at the secondary app, a first asset corresponding to the first content item, the first asset having the first configuration, and a fifth step of presenting, via the secondary app, the first asset in the first configuration.

In another aspect, a computer-implemented method of accessing data stored in a primary app via a secondary app in order to protect the integrity of the data is disclosed. The method includes a first step of obtaining, from the primary app and at the secondary app, a first content item, a second step of receiving, at the secondary app, a first request to modify the first content item, a third step of determining the modification involves non-substantive data for the first content item, a fourth step of modifying, at the secondary app, the first content item, and a fifth step of propagating the modification back to the primary app such that a record for the first content item at the primary app is updated to reflect the modification.

In another aspect, a system is disclosed for customizing a configuration of a content item in a secondary app. The system includes a processor and machine-readable media including instructions which, when executed by the processor, cause the processor to: (1) obtain, from a primary app and at the secondary app, a first content item; (2) detect, at the secondary app, at least a first label associated with the first content item; (3) determine, at the secondary app and based on the first label, that a first configuration should be applied to any asset corresponding to first content item, the first configuration implementing a first policy conforming to instructions associated with the first label; (4) generate, at the secondary app, a first asset corresponding to the first content item, the first asset having the first configuration; and (5) present, via the secondary app, the first asset in the first configuration.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIGS. 2A-2C collectively depict a schematic diagram of an environment for automatically reconfiguring content shared between two apps, according to an embodiment;

FIG. 9 is an example of the label change of FIGS. 7 and 8 causing a change in the presentation of a first asset corresponding to the first content item on board interface, according to an embodiment;

FIG. 10 is an example of a function provided by the secondary app in which additional details for an asset may be shown, according to an embodiment;

FIGS. 12A-12C are an example of a change in substantive data occurring in the primary app being reflected in the secondary app, according to an embodiment;

DESCRIPTION OF EMBODIMENTS

Figure 1:
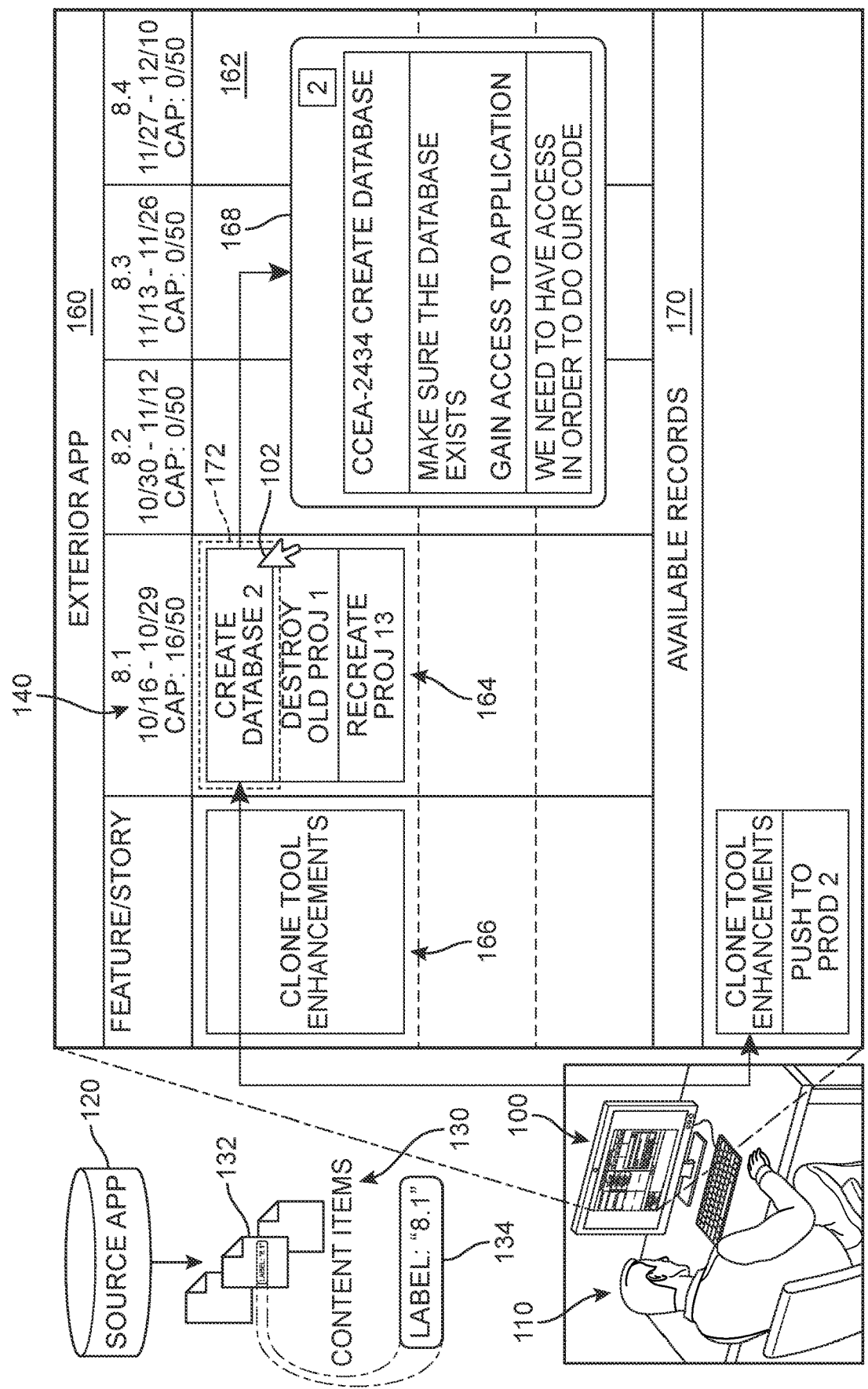
FIG. 1 is an illustration of an example of a user accessing a secondary app interface configured to present content from a primary app, according to an embodiment.

The embodiments provide a system and method for sharing content items between a first software application and a second (external) software application. The proposed system and method are configured to enable alterations in the configuration mode of each content item presented in the second software application based on labels assigned in the first software application. In other words, the two applications ("apps") are able to engage in inter-app communications with respect to the content items, such that a secondary app has access to some or all of the data managed by the primary application, and is capable of translating one or more labels associated with the content item. The labels can be used by the secondary app to determine the manner in which the shared content item will be presented in the secondary app, or the extent to which a user will be permitted to interact with said content item via the secondary application.

As a general matter, many conventional approaches to project management exist. Teams are often searching for tools to effectively manage the process of project development to meet user expectations in terms of functionality, cost, and delivery schedules. Whenever a project fails to meet these expectations, it is often a result of ineffective process management rather than ineffective developers or programmers. Such project management tools have been designed to some extent to allow larger and geographically distant teams interact remotely (e.g., over a network or the internet). However, no common management tool is currently available that can accommodate a group's specific needs throughout the project planning process. For example, numerous tools are available, some including RTC, HP Quality Center (QC), Service Manager, Clear Case® (CC), Sonar®, PPMC®, Jira®, Fitness, Cucumber, GitHub®, Jenkins, Evolven®, Clarity®, Visio® or even Excel® or Access® to track or plan a project's progress. Many of these tools are designed for a particular approach to the development process. Once various content has been uploaded and/or created via the selected tool, it is difficult to reformat or otherwise handle the data in a way that reflects the unique needs of a particular team for a particular project. In other words, these tools, while generally useful, lock users in to their features, and often fail to provide the necessary adaptability for team dynamics and expectations that can frequently change over time or from project to project.

As will be discussed in greater detail below, the proposed systems can make use of one or more features provided by conventional tools to generate alternate interactive user experiences via a second, external tool. For example, in some embodiments, a user, team, or other group may initially record, store, create, add, maintain, or otherwise manage content items in a primary app, also referred to herein as a source app. A secondary app, also referred to herein as an exterior app, communicates with the primary app and generates assets that correspond to the shared content items. In addition, the configuration of each asset can be customized by a user by the generation of labels that are linked to the content item in the source app. The subsequent presentation of an asset in the secondary app can then be modified to an extent to behave and/or appear in a desired configuration simply by adding and/or removing labels to the selected content via the primary app.

As used herein, the term "user" should be understood to refer to any end-user or person accessing an application configured with some or all of the features described herein. In addition, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" or "triggering event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to a presentation of content. As some non-limiting examples, an asset may include text in an actuatable pop-up window, interactive icons, or other manifestations of a particular content item. Furthermore, "content items" refer to individual pieces or data that are managed and/or maintained via the primary app (e.g., records in a database, emails, documents, images, audio files, video files, or other digital content). A configuration mode for a content item refers to the manner in which the content item is to function and appear. For example, a template or layout for a content item is selected based on the selected configuration mode, which in turn is based on one or more labels included in a content item Graphical user interfaces (GUIs) can be used to present information to a user in the form of icons, graphics, or other types of interactive elements. Such interactive elements are generally associated with a particular action or command. A user typically has to supply an input to a computing system that is associated with the interactive elements presented on the graphical user interface to execute the particular action or command. As used herein, "interactive element" broadly includes a wide variety of graphical tools or components, such as graphical icons, graphical menus, graphical buttons, hyperlinks, images, and any other element which can be displayed on a graphical display and associated with or otherwise linked to an action or process that is to be performed upon activation of an interactive element. In one embodiment, assets may correspond to interactive elements provided by the secondary app.

In addition, the term "issue tracking system" or "project management system" generally refers to a system that manages and maintains a list of tasks, issues, records, communications, etc., and may include features that enable the creating, updating, planning, reviewing, and/or tracking of content, and includes a database that stores the information, and can provide information about the status of these items. The term "metadata" is defined to be data that describes the content and context of a file with which it is associated. Metadata that is associated with a content item can indicate a project to which an item belongs, security or permissions of the item, labels associated with the content item, among other things.

Referring now to FIG. 1, for purposes of introduction, a first user 110 of an first exterior app 160 is shown viewing a first user interface ("first interface") 162 via a first device 100. As a general matter, the first device 100 can include an electronics unit comprising a plurality of different components, such as a user interface component (e.g., a touchscreen display, keyboard, mouse, speakers, etc.), a user interface module, a processor, and/or a communication module. For purposes of this example, first device 100 can be a desktop computer, laptop, tablet, or other computing device configured for connection to a network. Furthermore, the first device 160 includes one or more processors and memory. Memory may comprise a non-transitory computer readable medium. Instructions stored within memory may be executed by the one or more processors. A communication module may allow the first device 160 to communicate wirelessly. In different embodiments, the first device 160 may communicate with a mobile computing device, wireless devices, and/or with networked computers, for example over the internet. In this case, the communication module is a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In some embodiments, the first exterior app 160 is available at least in part as a local resource stored on the first device 100, while in other embodiments, some or all features and modules of the system are made available via a remote cloud service or network. In some cases, an optional authentication page is presented to allow the first user to access the user account that links the first exterior app 160 to the first source app 120. For purposes of this example, the first source app 120 provides various enterprise task management services. However, in other embodiments, the first source app 120 can be any other type of application for maintaining or handling data. In this case, the first user 110 is viewing, via the first exterior app 160, a plurality of asset items ("assets") 164 corresponding to content items 130 that have been obtained from a first source app 120, for example over a network. The depicted interface is shown only for purposes of illustration. However, it may be appreciated that the discussion herein can be applicable to asset configurations with much more complexity.

In FIG. 1, the first interface 162 displays a plurality of visual elements (e.g., text boxes or 'cards' 166) corresponding to each asset. In this case, the first user 110 is viewing several asset cards 166 that are displayed in a grid provided by the first interface 162. In some embodiments, one or more of the assets 164 can be interactive, allowing first user 110 to view additional information 168 (for example, by hovering a mouse cursor 102 over a first asset card 172), or allowing a user to move an asset from one location to another. In addition, the first exterior app 160 has 'translated' a first label 134 associated with a first content item 132 and obtained from first source app 120. More specifically, the first exterior app 160 has determined that the first label 134 ("8.1") serves as an instruction to apply a particular configuration mode whereby the first asset card 172 is automatically assigned to a grid column 140 characterized by a corresponding header of 8.1, for example when the first interface 162 is accessed. In another embodiment, the first asset card 172 is automatically moved to grid column 140 in response to a user selecting the first asset card 172 from a reference deck 170 (shown here as an available record repository or backlog) based on the label "8.1". In other embodiments, the configuration mode for the asset can vary widely based on the label(s) associated with the source content item.

In other words, at each access session for first exterior app 160, the user is presented with data corresponding to one or more content items shared by the first source app 120, where the presentation style of a content item in the first exterior app 160 is selected based on the labels that have been added to the content item in the first source app 160. Thus, in different embodiments, the first exterior app 160 can associate a particular configuration mode to a label or combination of labels that allow users to control the resulting outputted asset by the first exterior app 160. Furthermore, in some embodiments, the first exterior app 160 includes a capacity to receive changes to the 'meaning' of a label, such that a label can be redirected to elicit a different configuration as needed.

Figure 2A:
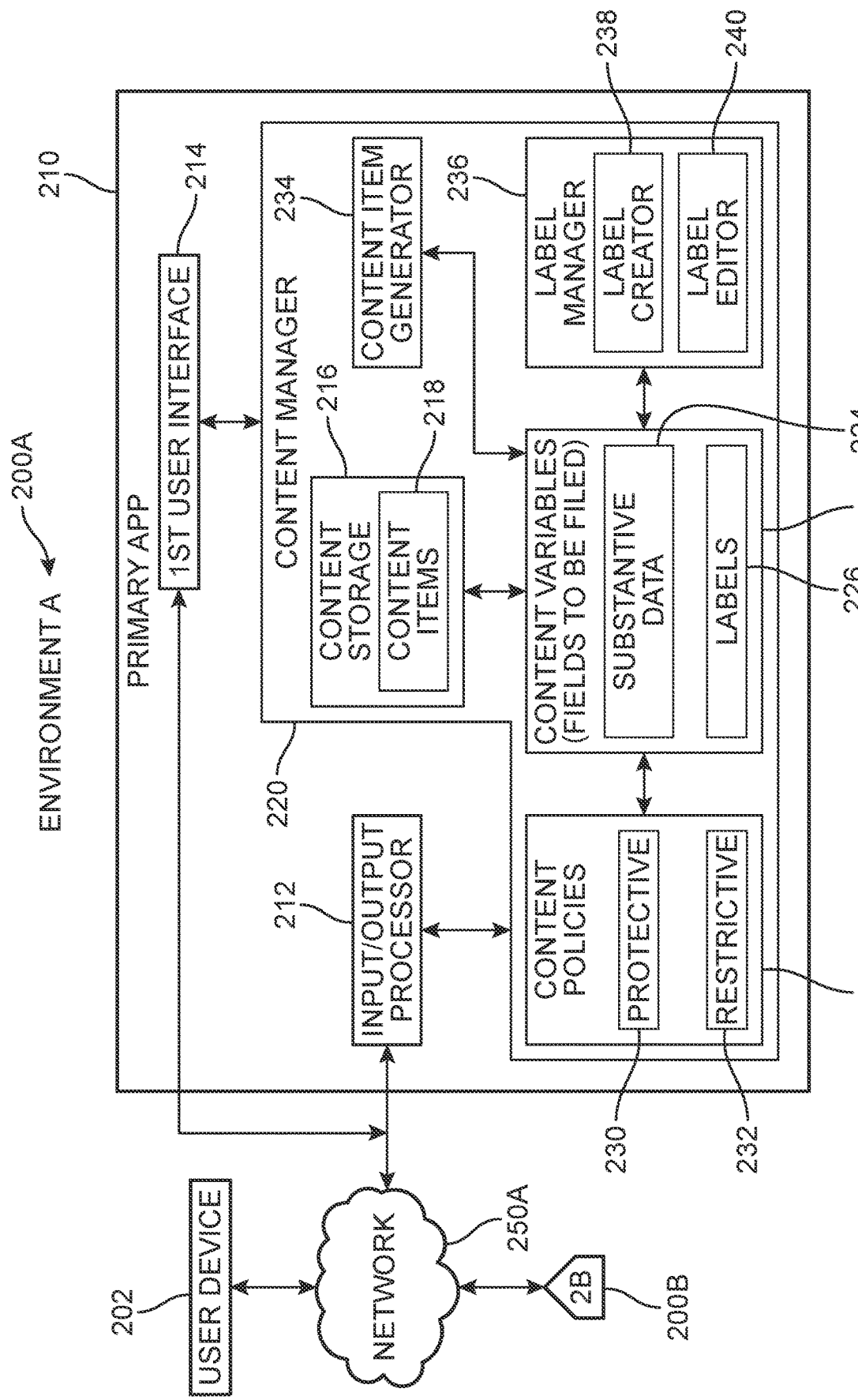
Figure 2B:
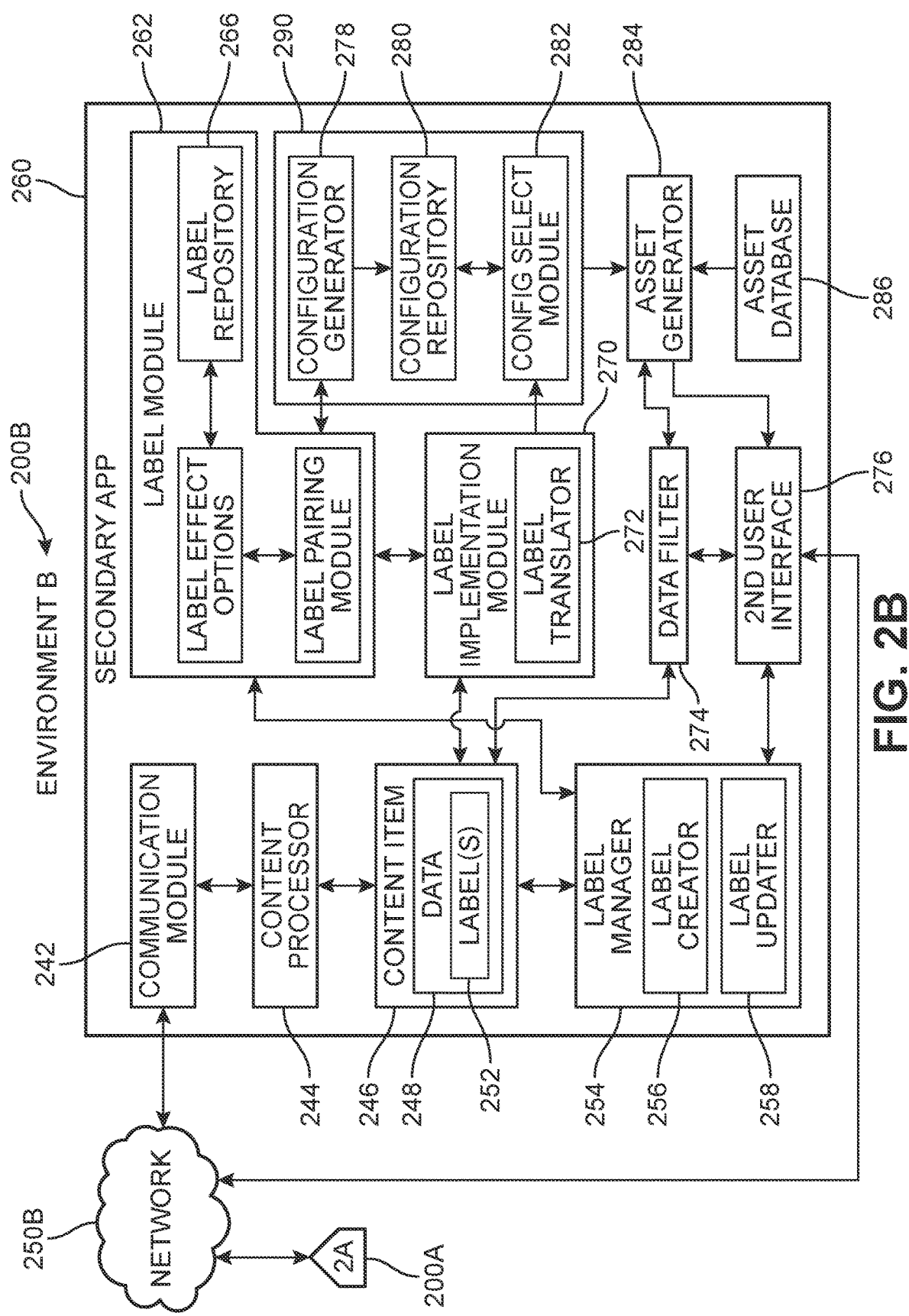

In order to provide the reader with a greater appreciation of the embodiments, FIGS. 2A and 2B depict an overview of an embodiment of a dynamic content configuration environment ("environment") 200 in which content obtained from a primary app 210 is refashioned by a secondary app in order to provide a wider range of options for interacting with each content item. For purposes of convenience, the environment 200 is partitioned into two connected drawings as "Environment A" 200a in FIG. 2A and "Environment B" 200b in FIG. 2B. In FIG. 2A, the Environment A includes the primary (source) app 210 as well as a client computing device ("user device") 202 from which a first user may access features and content associated with the primary app 210 via a network connection 250a. The user device 202 shown is included for purposes of representation of a community of users of primary app 210.

In different embodiments, user device 202 includes a device display ("display") that can present information and media of the primary app 210. As noted above, in some embodiments, primary app 210 can represent an enterprise management software product that is associated with an organization, business, or other entity (see FIGS. 3 and 4). For example, the user device 202 can receive and send information through a first user interface 214 that may be presented on their device display. The user interface and display may represent a common component or may represent separate physical or functional components. In some embodiments, display may be a touchscreen, allowing the customer to interact with the user interface directly by touch. The user interface may refer to an operating system user interface or the interface of one or more software applications that may run on the client devices, such as primary app 210. In one embodiment, the user interface includes entry fields for content item name, status, priority, leads/workers, category, expected outcome, next steps, notes, dates, project initiator, etc. The user interface may include additional entry fields for additional information without departing from the scope of the present discussion. The user interface can additionally include selection buttons which allow the user to submit or cancel generation of a new content item. Once the user submits the information, the data provided will be added as a new entry in content items 218.

While the various components of the primary app 210 are shown as being accessed through a cloud network and/or stored on a cloud-based server in FIG. 2A, in other embodiments some or all components described herein can be reside in the client device(s) and/or a remote server. In some embodiments, the primary app 210 is a resource or project management software application platform ("platform"). However, in other embodiments, the primary app 210 can represent any source workflow management system or data management system. For example, in an enterprise environment, server systems can also be provided to perform data management, such as to back up data, archive data, stub data, apply a data retention policy, and/or apply a legal hold on data, etc. Backing up data of an electronic device at a storage system associated with a server system can allow for later recovery of data should a fault occur at the electronic device that leads to data corruption or loss. Archiving data allows the data to be moved from an electronic device for storage in a separate location to reduce consumption of storage resources at the electronic device. Stubbing data refers to removing a data item from an electronic device to a separate location while leaving a link (or "stub") that can be used to link to the data item at the separate location. The server system can apply a data retention policy to determine which data items to retain and which to delete. The server system can also apply a legal hold on data for legal reasons, such as to satisfy discovery obligations in litigation. There can be other data management actions that can be applied on data, such as understanding the confidentiality of data, determining whether encryption should be applied, determining whether data retention should be limited or whether expedited destruction should be applied.

In addition, in some embodiments, the primary app 210 can be configured to manage various characteristics of the data (content) items, including a sensitivity level of the data item, a confidentiality level of the data item, a context associated with the data item, and so forth. As some non-limiting examples, the data item can be classified as being a confidential document, a multimedia file such as a music file or video file, a legal document that is subject to a legal hold policy, a collaboration document that is to be collaborated among multiple users, a document that is to be synchronized among multiple devices, etc. Based on the classification applied on the data item, the data manager can invoke at least one of multiple functional features that apply corresponding actions on the data item.

In addition, as the primary app 210 is configured to communicate with secondary app 220, the secondary app 220 may from time-to-time share limited modifications made to a content item (see FIG. 2B). In such cases, the data manager for primary app 210 can invoke a synchronization feature for synchronizing the content item such that the data a given user (or group of users) refers to maintain a synchronization as they are being modified. A change in a first data item at a first electronic device in the private cloud can be communicated to the other electronic device(s) of the private cloud, such that the change can also be applied to a version of the first data item that may be kept at the other electronic device(s). Such synchronized data in the private cloud of the user is readily accessible by the user regardless of the electronic device the user is using or where the user is located.

In different embodiments, a user may access primary app 210 in order to perform one or more tasks. In some embodiments, the primary app 210 can represent an interactive application that provides a site from which the user can create and maintain an account, access information and options related to their enterprise or task, perform various operations, and/or create, edit, or review content items that are available via a content manager module 220. For example, a user can enter various inputs via user device 202 via first user interface 214. Through the first user interface 214 the user may access various content items 218 for which they have been granted permissions and that have been made available to the system. In one example, the content items 218 are stored as a component in primary 210 (i.e., content storage module 216), while in other embodiments, some or all of the content items 218 can be stored remotely and accessed by the content manager 220 as needed. Furthermore, in some embodiments, the primary app 210 can be configured to receive new content items, either as uploaded or transferred datasets, or directly through the first user interface 214 via a content item generator 234 that allows users to create new records and enter inputs for the content variables 222. The user can then add information to various fields (content variables 222) as well as establish policies 228 for the content item.

In different embodiments, a content item may include a plurality of data such as but not limited to content variables 222. Content variables 222 generally refer to data that is added to one or more fields managed by the system. The fields can be pre-populated based on one or more content characteristics of a content item, or can be filled and/or modified by users. In some embodiments, one or more fields in a data record for a content item may be added or deleted. For purposes of reference, these variables 222 are categorized as substantive data 224 and label(s) 226.

For purposes of this application, substantive data 224 is modifiable only via primary app 210, and may even be read-only or unavailable through the primary app 210 depending on the user's account level and permissions. In some embodiments, primary app 210 can include or have access to content policies 228 that may be applied to safeguard a content item record. For example, there may be protective policies 230 that are automatically triggered in order to protect the integrity of some or all of the data associated with a content item, thereby preventing any changes to the data as a whole, or based on the user, the content type, or enterprise policy. Similarly, restrictive policies can hide or show specific portions of data based on the privacy settings established by the enterprise or other user.

On the other hand, labels 226 are typically configurable as more fluid and dynamic variables in the primary app 210. In one example, a primary label manager 236 allows users to add labels to a content item (e.g., via a label creator 238) and/or edit or delete previously generated and assigned labels (e.g., via a label editor 240). Labels 226 may also be referred to interchangeably as tags throughout this disclosure. Thus, any app in which a labeling or tagging function for content is available (or may be added, e.g., as a plugin or other code) may serve as the primary source app. Labels can be pre-set, such that a user must select from an existing list of labels provided by the primary app, or they may be ad-hoc, where a user may customize and create any label they wish to add to a content item in the primary app. Each label can be linked to an effect in the configuration of the content item in the secondary app.

In some embodiments, the labels 226 can also refer more broadly to data for the content item that are non-substantive. The non-substantive data can vary from one primary app to another primary app. In other words, what is non-substantive data (and therefore modifiable via both the primary app and the secondary app) for a first content item in a first type of primary app may differ from what is non-substantive data (and modifiable via the primary app and secondary app) for a second content item in a second type of primary app. Some non-limiting examples of such non-substantive data may include categories, dates, workflow stages, status, condition, etc. These examples are simply for purposes of illustration. Thus, in some embodiments, one or more (non-label) data fields for a content item that are non-substantive can be modifiable via secondary app and these changes can then be allowed to propagate back to primary app.

In different embodiments, labels 226 can be freely available to users as they view content item records, or only to those users with permissions to do so. In some cases, labels 226 may be useful in the characterizing of content items 218. However, it should be understood that labels 226 are themselves without significance in terms of the content of the content item itself. In other words, a content item can be fully generated, stored, rendered, or accessed even if said content item has no labels associated with it. However, a content item cannot simply comprise a label or otherwise exist without at least one substantive data field being filled (e.g., such as a subject or title field). Thus, labels are generally optional, and are not configured to affect the integrity of the content item to which they are assigned, or cause any other change in the presentation or handling or other configuration of the content item while in the primary app.

In different embodiments, the primary app 210 can be configured to facilitate or permit external applications or tools to communicate with content manager 220, for example via an input/output processor 212. In some embodiments, the primary app 210 can supply a portion (i.e., one or more fields) of or an entirety of content items 218 with the external application, presented in FIG. 2B as a secondary app 260. In other words, the primary app 210 can serve as the source of "truth" (e.g., primary app 210 can provide access to data that is safeguarded by the primary app 210) for the secondary app 260, while the secondary app 260 can offer more flexibility in how the content items are handled.

In different embodiments, user device 202 accesses secondary app 260 via a second user interface 276. The user interface generated by secondary app 260 can be sent over a network 250b to a computing device operated by a user and then displayed on a suitable display device, in one example. In an alternate example, the user interface can be implemented at least in part on a computer device operated by the user. The secondary app 260 can request data from primary app 210 via a communication module 242 configured to enable inter-app communications. In some embodiments, the secondary app 260 obtains content from primary app 210 and a content processor 244 is configured to process the received data. The content processor 244 can define and classify information needed to populate at least a portion of a function or feature for secondary app 260, in one example.

In a further embodiment, the content processor 244 is configured to read the content information and pre-populate a template based on the desired format of the user. For example, once the content item is received, specific information about the item need not be entered, but is automatically sorted and prepared for use by secondary app 260. In another example, the content processor 244 identifies and classifies each content item 246 and associated data 252 including any labels 248. In one embodiment, a data filter 274 is configured to filter one or more fields of content data based on the current user's identification. Filtering includes, without limitation, suppressing the display of selectable information in a text entry field so that the user is not displayed the information and/or cannot select it or edit it. Such filtering may be over-ridden by the user in some examples, providing the user the ability to enter any information into the form.

In some embodiments, the content item 248 can include information related to the project, tasks, users, and/or workgroups to which it is associated. This information may include, without limitation, task name or description, task lead, manager responsible for the task, manager responsible for the task lead, department, workers supporting the completion of the task, category of the task, performance notes, required and optional steps, calendar entries, proposed timelines, time entries, and the like. In another example, the information may include a start date, time spent, expected outcome, next steps, and project links. This listing is merely illustrative and is not exclusive of other descriptions within this application in relation to the content items. Project links provides hyperlinked documents that can be retrieved over a local-area network (LAN) or over a wide-area network (WAN), such as the Internet.

In some embodiments, an asset generator 284 is configured to retrieve information for a content item for the purpose of automatically transforming or repurposing the data toward the desired output. The asset generator 284 can in some embodiments make reference to an asset database 286 in order to represent the content item via second user interface 276. In addition, as discussed earlier, in different embodiments, the content items that include labels 248 may be handled differently. In FIG. 2B, it can be seen that data for each content item 246 that includes a label can be passed to a label implementation module 270, which is configured to 'translate' (via label translator 272) or otherwise determine what effect the one or more labels 248 should have on the manifestation of the content item in secondary app 260. The label translator 272 can communicate with a label pairing module 268, which includes the current listing of labels and their corresponding effects on the content item as presented by the secondary app 260.

Referring to FIG. 2C, some non-limiting examples of label effect options 264 that may be triggered by the presence of a particular label are shown. In some embodiments, appearance of a content item can be directly selected or altered, including color, shape, font, size, outline, and/or format. Thus, a label "Purple" can be linked to an effect that causes the content item to be rendered in a purple graphic in the secondary app, a label "Card" can be linked to an effect that causes the content item to be rendered with a square or rectangular shape (i.e., similar to a Post-It® note or index card), or shapes such as "circle", "hexagon", etc., labels "large", "small", "medium", "XL", etc. can be linked to an effect that causes the content item to be rendered in different sizes relative to other assets, labels "Arial", "Times New Roman", or other font names can be linked to an effect that causes the content item to be rendered in a specific font type, labels such as "thick", "dotted", "wavy", etc. can be linked to an effect that causes the content item to be rendered inside a shape that has a particular line type or weight, and labels such as "bold", "italics", "underline", "highlight", etc. can be linked to an effect that causes the text for content item to be rendered with a particular effect. Other appearance effects that are known can also be directed by the label attached to the content item.

Similarly, labels can be added that are configured to (a) turn on or off a hover function (see FIG. 10) that automatically presents additional details for the content item when the user moves a cursor over its asset or (b) changes to the asset when a user clicks on the asset. Other labels can be used to (c) allow the asset to be movable from one position to another in the interface (e.g., as a drag-drop function or double-click), (d) limit an aspect of the content item as read-only even in the secondary app, (e) a lock function that prevents movement of the asset by some or all users, (f) workflow labels that anchor or link the content item to other content items such that these content item families remain together or are arranged under a particular project or task name, or automatically positions the asset in a specific location or section on the interface, (g) a hide label that can selectively hide information for a specific field, (h) a show field that can selectively show information for a specific field, (i) a password protection label that limits visibility of the content item requiring a user to provide a password, (j) security restriction labels that can limit access to the content item asset to one or more user accounts, levels, or types (a label "Harrison" can be linked to an effect that causes the content item to only be available in the secondary app to a user account associated with Harrison, etc.), (k) image library labels that can identify a specific graphic or other image that should be shown with the content item via a library of tagged images accessible by the secondary app, (l) a slideshow label that can cause the content item to be displayed in a rotating slideshow with other content items, (m) audio library labels that can identify a specific sound or other audio that should be played with the content item, or when a particular field is viewed, via a library of tagged audio files accessible by the secondary app, and/or (n) a priority label that causes one asset to be shown first or "on top" of other assets, or subsequent or "below" other assets, etc.

In different embodiments, these pairings can be customized and/or changed over time per the users' needs, for example via a secondary label manager 254 that enables users to create/add new labels to a content item (e.g., via label creator 256) and/or to modify/delete existing labels associated with a content item (e.g., via label updater 258). In some embodiments, the secondary label manager 254 can offer a GUI that includes fields for adding or changing labels, while in other embodiments, a user's direct interaction with an asset (see below) can trigger an automatic change in a label for a content item. In one example, the secondary label manager 254 is in communication with a label module 262, allowing users to select from or add a label to a current listing of available labels (label repository 266) that may be applied by the label implementation module 270, as well as assign an effect to the selected label by selecting an effect from a plurality of label effect options 264 that are available (thereby creating a linked label-effect pairing). In some embodiments, if additional labels are added to a content item, or the labels for a content item are changed, this change (unlike changes related to substantive data) can be permitted to propagate back to the primary app.

In order to execute or provide the effect that is paired to a particular label, secondary app 260 can include a configuration manager 290 that receives pairing information from label module 262 in order to generate the appropriate policies, each policy directed toward providing instructions that are compatible with or otherwise execute the various labels that may be associated with a content item. In one embodiment, the designated configuration can include one or more policies that will enable the content item to include the features or characteristics elicited by the label or combination of labels, such as policies directed to the presentation or template of the asset for the content item. These generated configurations are stored in a configuration repository 280 for use by a configuration selection module 282 that is triggered when a particular content item with a label is accessed. For purposes of this disclosure, a configuration includes one or more policies providing programming instructions, protocols, standards, and tools for causing content to be provided as assets by secondary app 260 in a particular manner or presentation style. Thus, a label can trigger the implementation of a particular configuration mode that enables the content (as an asset) to provide the ability to accomplish specific tasks with said content or is otherwise interactive.

In one example, a configuration can include instructions to execute a specific template or layout for a content item. For example, a template for a slideshow-based content item may include placeholders for a title and a carousel of images of products being advertised, while another template may include placeholders for a single image and textual content, such as a product description and pricing information, and yet another template may include due date fields, responsible person fields, etc. In addition, in some embodiments, the configurations available for selection can be dynamically updated to serve the team or project. In some cases, there may be a pre-stored set of configuration modes that can be provided by the secondary app 260.

In different embodiments, a particular label may be applied to a content item in order to require a particular template to be implemented when the content item is presented or otherwise accessed. For example, some groups of users may respond better to (e.g., interact with more) depictions of content that are presented using certain types of templates, while other groups of users may respond better to other types of templates. Similarly, some types of templates may receive a better response when presented on or with resources having certain attributes (e.g., content, topic, color scheme, sounds, images, etc.) than on other resources having different attributes. Thus, the particular template or features that are selected for providing the content can be easily changed by assigning a new label or changing a previous label to provide content to users having the combination of attributes best suited to the team's goals, making the system a customization-friendly handler of data that was originally static or limited.

The configuration selection module 282 is configured to receive directions from the label translator 272, which is used to determine which configuration should be selected. The selected configuration is then sent to the asset generator 284, which has also obtained the information for the content item itself. In response, some or all of the data associated with content item is transformed and presented as an asset that aligns with the user's needed functionality for the given content item and/or content project. In one embodiment, the asset generator 284 is configured to pre-populate data fields based on the content item and the policies associated with the current user. Other aspects related to the asset can be pre-populated as well, in other examples, such as pre-populating a background of the user interface with the selected project's name, pre-populating columns or rows with stage or increment identifiers, pre-populating a selected project grid with content items related to said project, pre-assigning the content items to specific categories per labels, pre-setting various priority dates or orders to content items, etc. (see for example FIGS. 5 and 6 below). In some cases, pre-populated data or templates can be overridden by the user. In other cases, it may be advantageous for the user not to have the ability to override that selection. Thus, the resulting assets are made available to the user via second user interface 276.

Furthermore, in some embodiments, if a user attempts to make changes to a content item via secondary app 260, the data filter 274 can block access to information that is restricted and/or secured in order to ensure data integrity. For example, substantive data may be presented in a tamper-resistant or unmodifiable format, while the labels remain editable.

Figure 3:
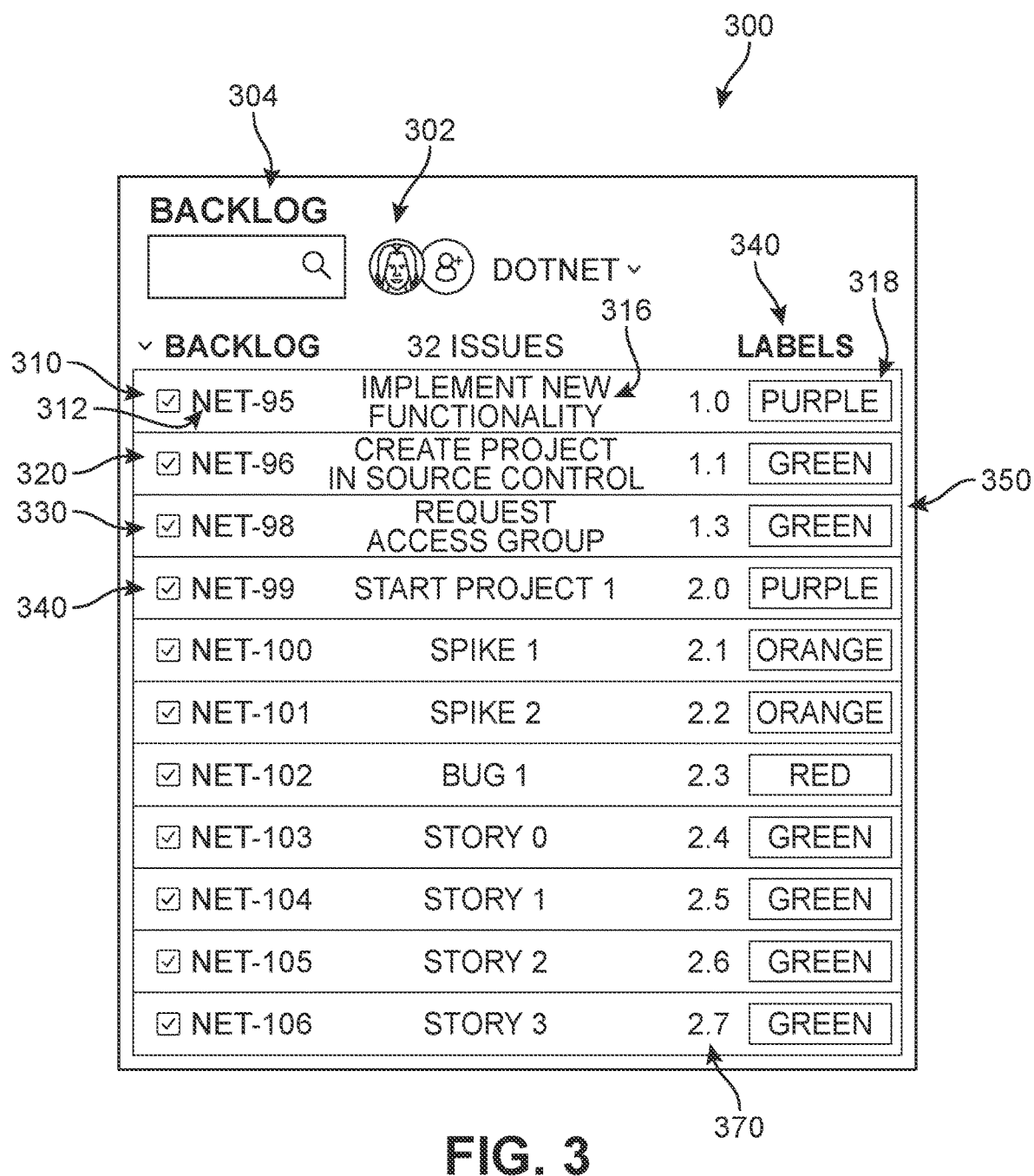
FIGS. 3 and 4 illustrate an example of a set of content items being transferred from a primary app to a secondary app, according to an embodiment.

Referring now to FIGS. 3-6, one example of an implementation of a secondary app with a user interface configured with a dynamic content configuration system ("system") is presented. In FIG. 3, an example schematic diagram illustrates an issue tracker portal interface 300 that corresponds to one type of primary app. The portal interface 300 includes a toolbar 302 with various menu items and shortcuts (e.g., Search box, User History, Dashboard tab, Issues tab, Account tab, Settings tab, Action Plans tab, Tasks tab, Reporting tab, Education tab, Help tab, etc.). In this example, the user is viewing an issue backlog page 304 which represents one type of interface that can be provided by the primary app. In this case, the page includes a listing 350 of various issues (i.e., content items) that are yet to be performed or scheduled. In some embodiments, assigned labels 342 for each of the content items can also be shown. For purposes of simplicity, the labels in this example are limited to colors and workflow stage identifiers; however, as discussed earlier, it should be understood that a wide range of labels may be assigned.

In other embodiments, the primary app can include interfaces of any other format or information that can provide access to other types of content items (e.g., issue summary, description, key dates, general details, e-mails, photos, slideshow, spreadsheet, database, classification, data fields, repeat and related issues, relationships, additional details). Such data can be imported, accessed, or created by a back-end team or other end-users. For purposes of this example, the backlog page 304 includes a first content item that will be referred to as a first issue 310 ("NET-95/ Implement new functionality/1.0/Purple"), as well as a series of additional issues such as a second issue 320 ("NET-96/Create project in source control/1.1/Green"), a third issue 330 ("NET-98/Request Access Group/1.3/ Green") and a fourth issue 340 ("NET-99/Start project 1/2.0/Purple"). Thus, each of the issues can be seen to include a project identifier 310, a title 316, and labels 342 including workflow indicators 370 and colors 318. In this example, the issues are all associated with a first team "DOTNET".

Figure 4:
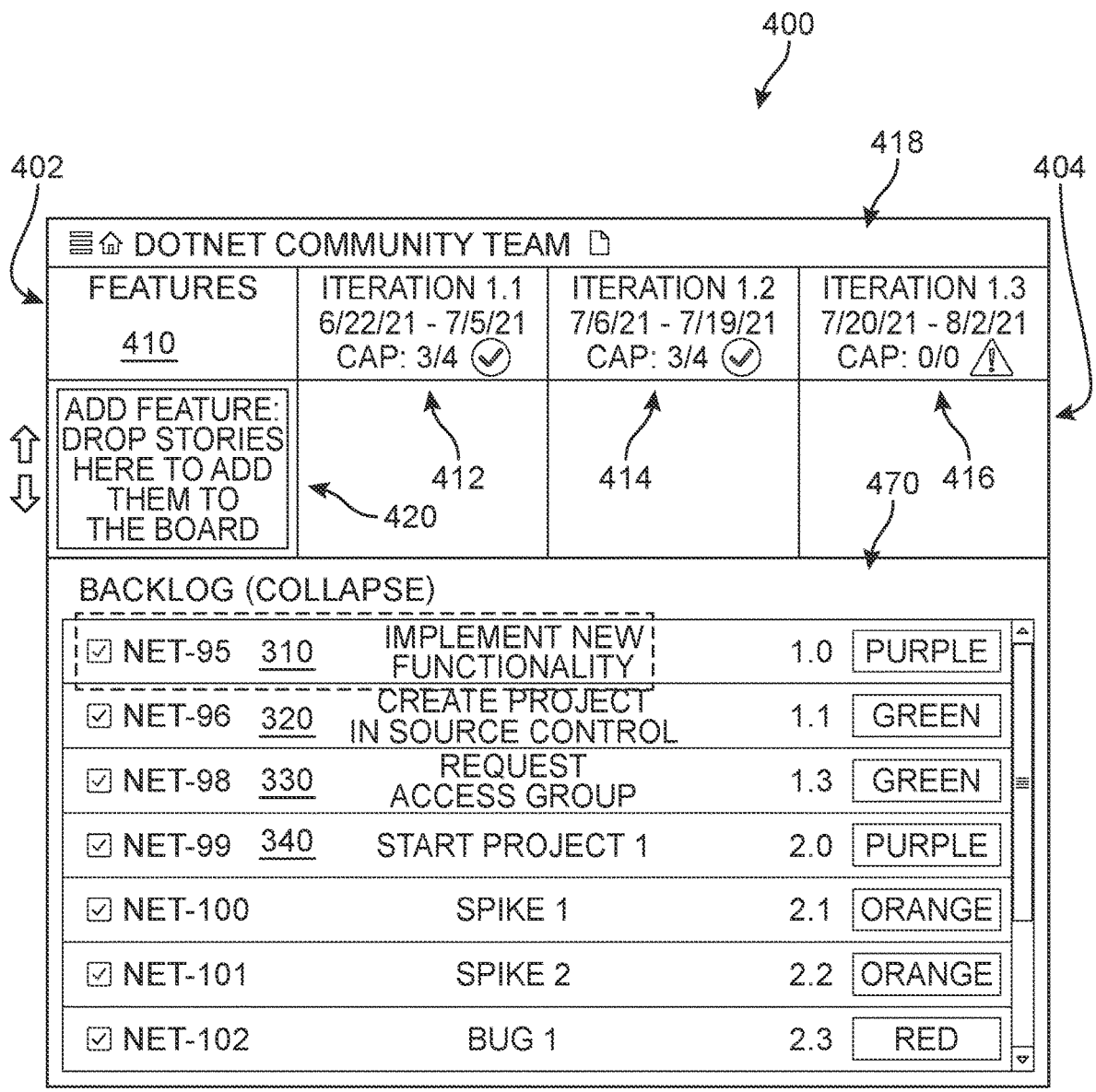

Moving to FIG. 4, an example of a secondary app interface 400 is depicted. The secondary app interface 400 comprises a workflow board 418 generally simulating a physical storyboard in which index cards or other notes can be added to a chart or grid to indicate when or how a project or task is to occur (a type of project planning). The secondary app interface 400 includes a first row or first lane 402 in which column headers are pre-populated based on the operation of the selected secondary app. In other embodiments, the secondary app can be configured to offer other types of functions or layouts. In this case, the secondary app has been selected in order to provide additional planning tools to users of the primary app. In FIG. 4, the pre-populated column headers include a first header 410 ("Features"), a second header 412 ("Iteration 1.1/6/22/21-7/5/21/CAP: 3/4"), a third header 414 ("Iteration 1.2/7/6/21-7/19/21/ CAP: 3/4"), and a fourth header 412 ("Iteration 1.3/7/20/ 21-8/2/21/CAP: 0/0"). In some embodiments, these headers can be added/edited by an end-user directly via the secondary app, while in other embodiments, a label attached to the content items can indicate that a header with a particular content should be created and the resulting asset be linked to a position under that header.

In a second row or second lane 404 directly under the headers, there are empty boxes, configured to receive the assets (cards) that will be generated for each content item. In an optional embodiment, the system can display instructions 420 ("Add feature: drop stories here to add them to the board") that can guide the user. Below the board 418 are an instance of content items obtained from the primary app of FIG. 3. An issue panel 410 can list one or more available content items, and each selectable listing can show various data for each content item; those shown here are only for purposes of illustration. In some embodiments, the content items that will be shown will be based on the Project or Group selected by the user, or the user's account or status. In this case, the DOTNET TEAM was selected. Thus, the issue panel 410 lists the same issues seen in FIG. 3. For purposes of this example, the user has selected the first content item corresponding to first issue 310 (represented by a dotted line). In some embodiments, the secondary app can include a drag and drop functionality, enabling a user to move items from the issue panel 410 to the board 418.

Figure 5:
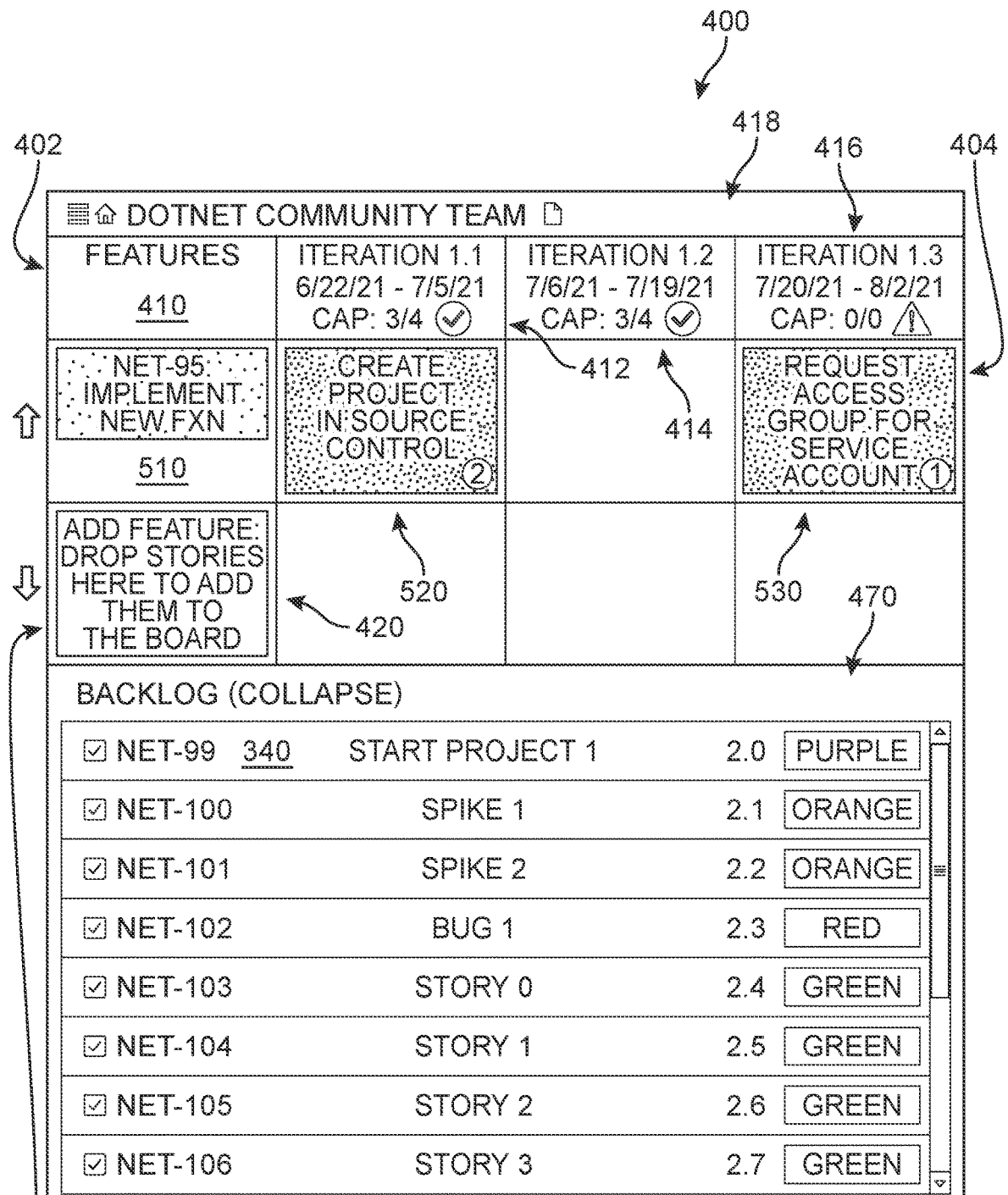
FIGS. 5 and 6 illustrate a process in which the content items of FIGS. 3 and 4 are added to a board interface in the secondary app as assets, according to an embodiment.
Figure 6:
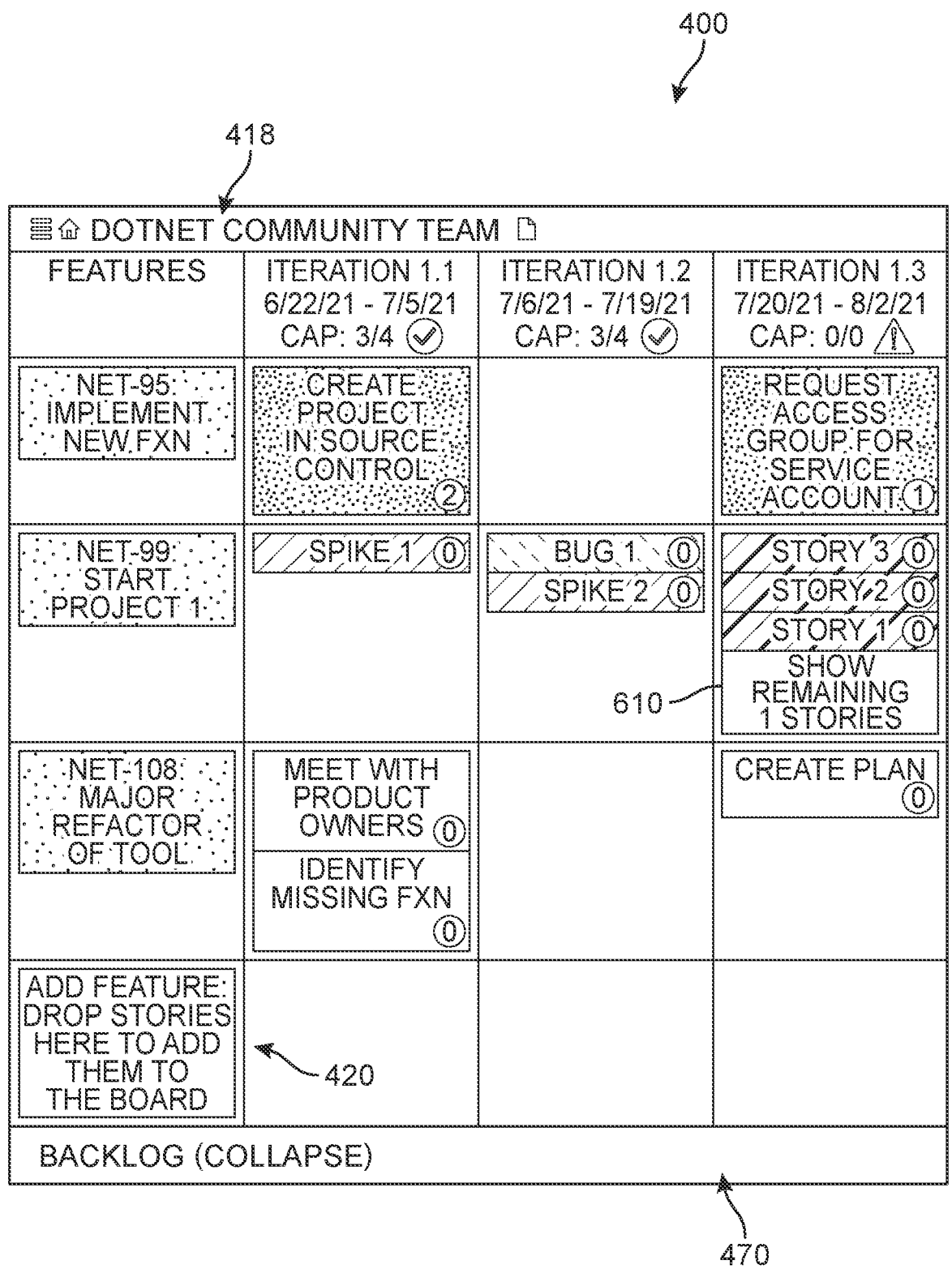

As shown in FIG. 5, in response to a user dragging and dropping first issue 310 to the board 418, the first issue 310, being an independent project as indicated by the workflow stage "1.0", is moved automatically to the correct column (under "features") as a first asset or first card 510. Similarly, in some embodiments, the system is configured to automatically move the remaining 'family members' of the project to the appropriate column. Thus, the second issue has been converted into a second card 520 and the third issue into a third card 530, and each has been placed into the spot under the column with the iteration corresponding to the issue's workflow stage label. Furthermore, it can be appreciated that the colors for each of the cards (represented here as stippling) is based on the color label that was assigned to that issue. Thus, first card 510 is purple, second card 520 is orange, and third card 530 is orange (where colors for the cards are represented in the drawings by varying dotted lines and/or cross-hatching). In other embodiments, colors may be automatically applied based on the workflow stage label for the item. For example, workflow stage 1.1—labeled cards can be orange, workflow stage 1.2—labeled cards can be yellow, workflow stage 1.3—labeled cards can be green, etc. In addition, in some embodiments, the system can automatically generate a new row or second lane 506 for users to drop more issues into, as shown in FIG. 5. In addition, the remaining items in the backlog panel 470 have moved up, revealing additional issues in the listing. in some embodiments, the backlog panel 470 can include a collapse option to minimize the panel and/or cause the board 418 to fill the screen. If collapsed, the panel can then offer an expand option to open the panel up again and/or cause the board and panel to more equally share the screen. In some embodiments, as shown in FIGS. 5 and 6, navigational tools may also be provided with respect to each "lane". For example, an up arrow and down arrow may be available for user selection in order to scroll up and/or down when there are more lanes than can be clearly displayed on the screen. In one embodiment, these arrows will be defunct, removed, or otherwise nonfunctional in cases where the number of lanes is able to fit in the display space.

In FIG. 6, all of the available issues listed in the backlog panel 470 have been pulled into the board 418. In some embodiments, once the main project or feature issue (e.g., NET-95, NET-99, NET-108) has been moved to the board 418, each of their family member issues (NET-100, NET-101, NET-102, NET-103, etc.) are automatically arranged to align with the move, while in other embodiments, users can manually drop each card on the board 418. In this example, three lanes have been generated, each corresponding to a separate workflow of the DOTNET team's agenda. In some embodiments, for purposes of clarity, a section of the board can limit the number of issues or "stories" that are listed, and instead simply indicate that additional issues are located in that box. In one embodiment, a selectable option 610 can trigger the display or reveal of the hidden issues.

Figure 7:
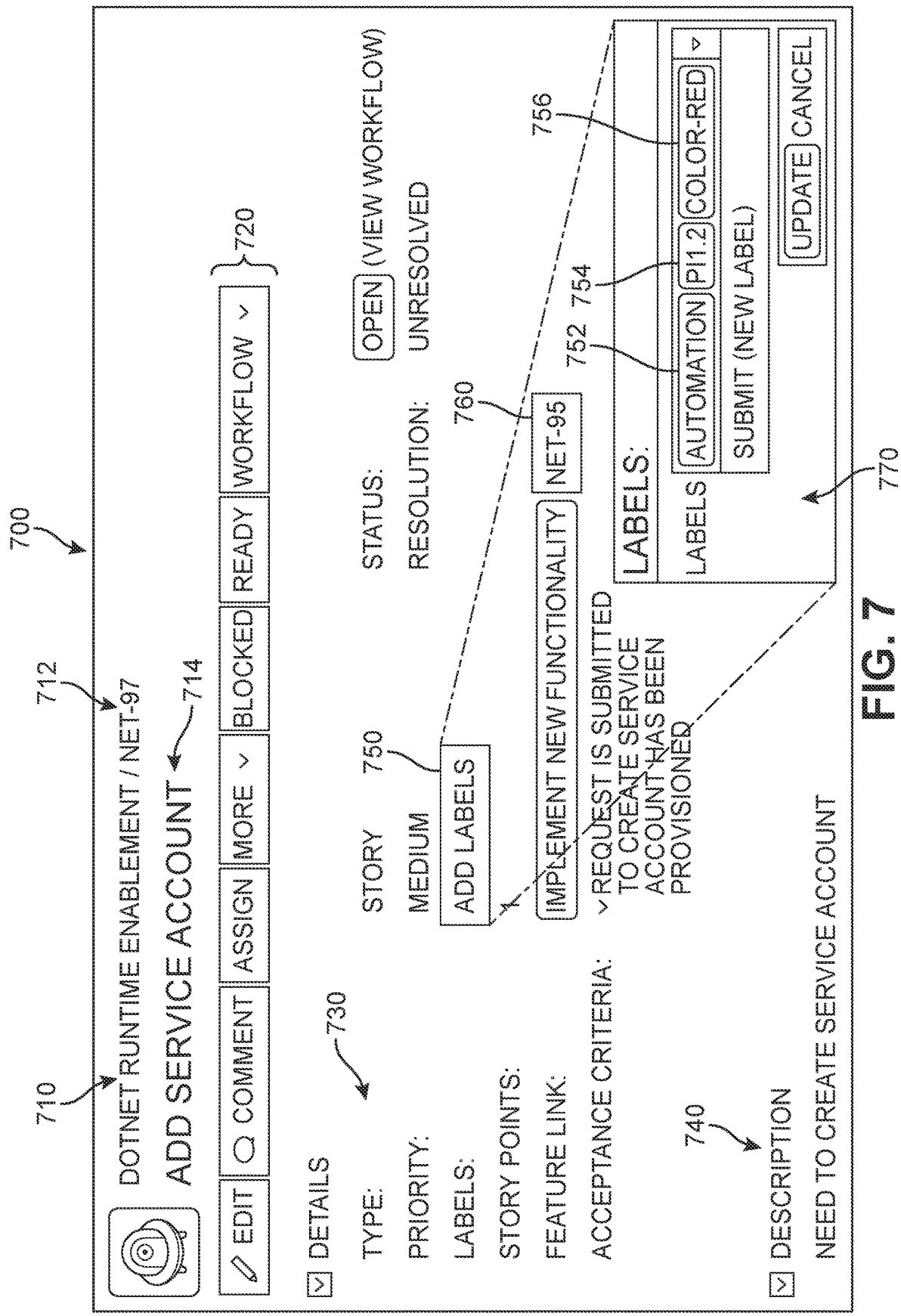
FIGS. 7 and 8 illustrate an example of a change made to a label for a first content item, according to an embodiment.
Figure 8:
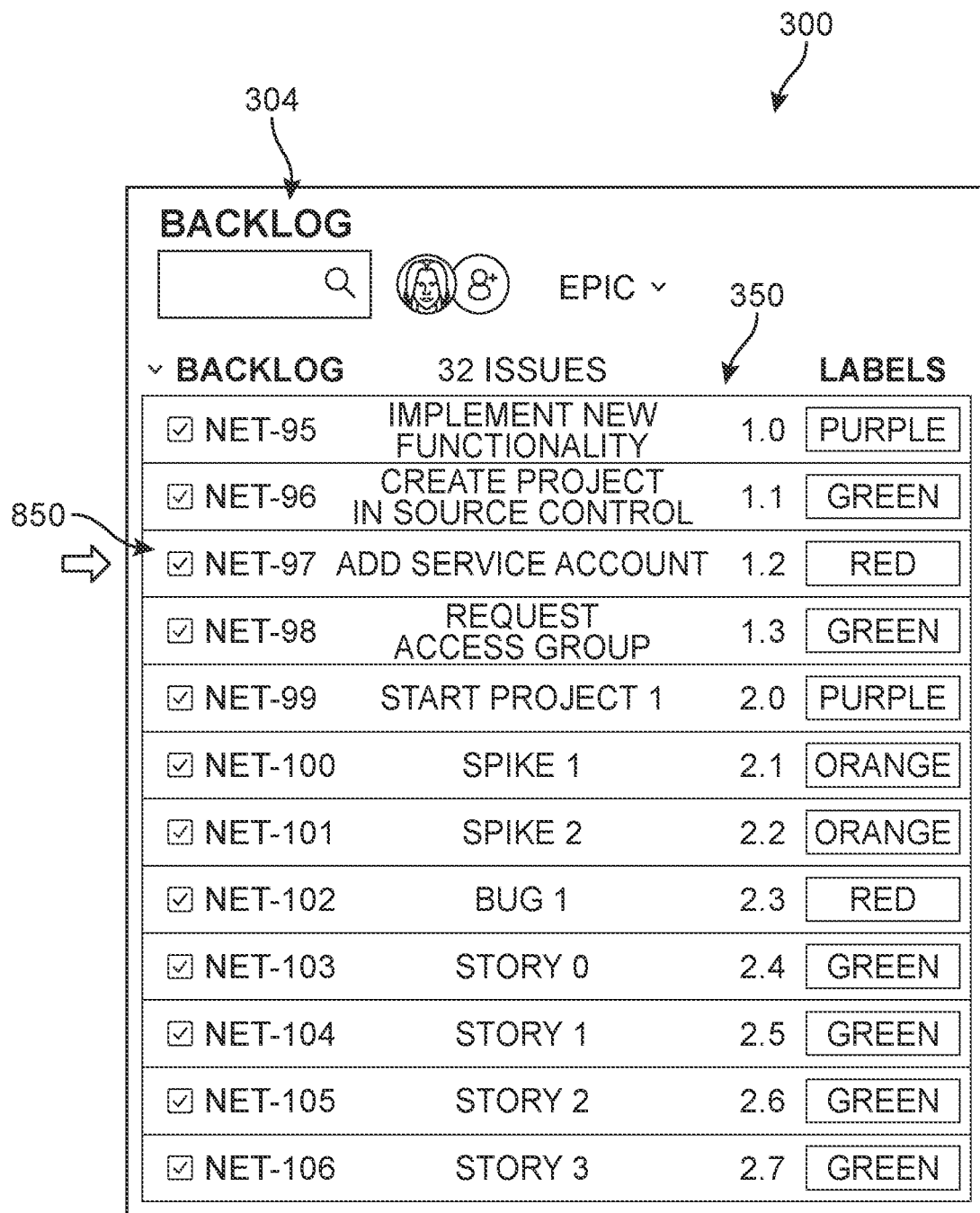

As discussed above in FIG. 2A, content items can be created via the primary app. An example of a generic content generation interface 700 that may be provided by a primary app is shown in FIG. 7. In this example, the interface 700 includes fields describing the content's classification 710 (under the DOTNET team), the project ID 712 ("NET-97"), title 714 ("Add Service Account"), various menu tools 720 (e.g., Edit, Comment, Assign, More, Blocked, Ready, Workflow), details 730 with a plurality of sub-fields (e.g., type, priority, labels, story points, feature link (which can also link the content item to a parent project (e.g., under NET-95), acceptance criteria, status, resolution), and description (Need to create service account). For purposes of this example, the various fields and sub-fields can be understood to mainly comprise substantive data. However, some of the data associated with the content item is non-substantive, and will be modifiable after the content item has been created, either via primary app and/or secondary app. More specifically, fields such as labels, priority, feature link, can be non-substantive. In FIG. 7, an Add Labels option 750 is selected, which triggers display of a first label maker dialogue box 770. In this case, the user has added several ad-hoc labels, including a first label 752 ("Automation"), a second label 754 ("PI 1.2"), and a third label 756 ("Color-Red", or simply "Red"). Once these labels are submitted, they will be stored as part of the record for the content item "Add Service Account". In some embodiments, as shown in FIG. 8, the content item is automatically added to the issue tracker portal interface 300 as another issue in the backlog page 304. In FIG. 8, a fifth issue 850 ("NET-97/Add Service Account/1.2/Red" has been inserted directly into the grouping of other items associated with project NET-95.

Figure 9:
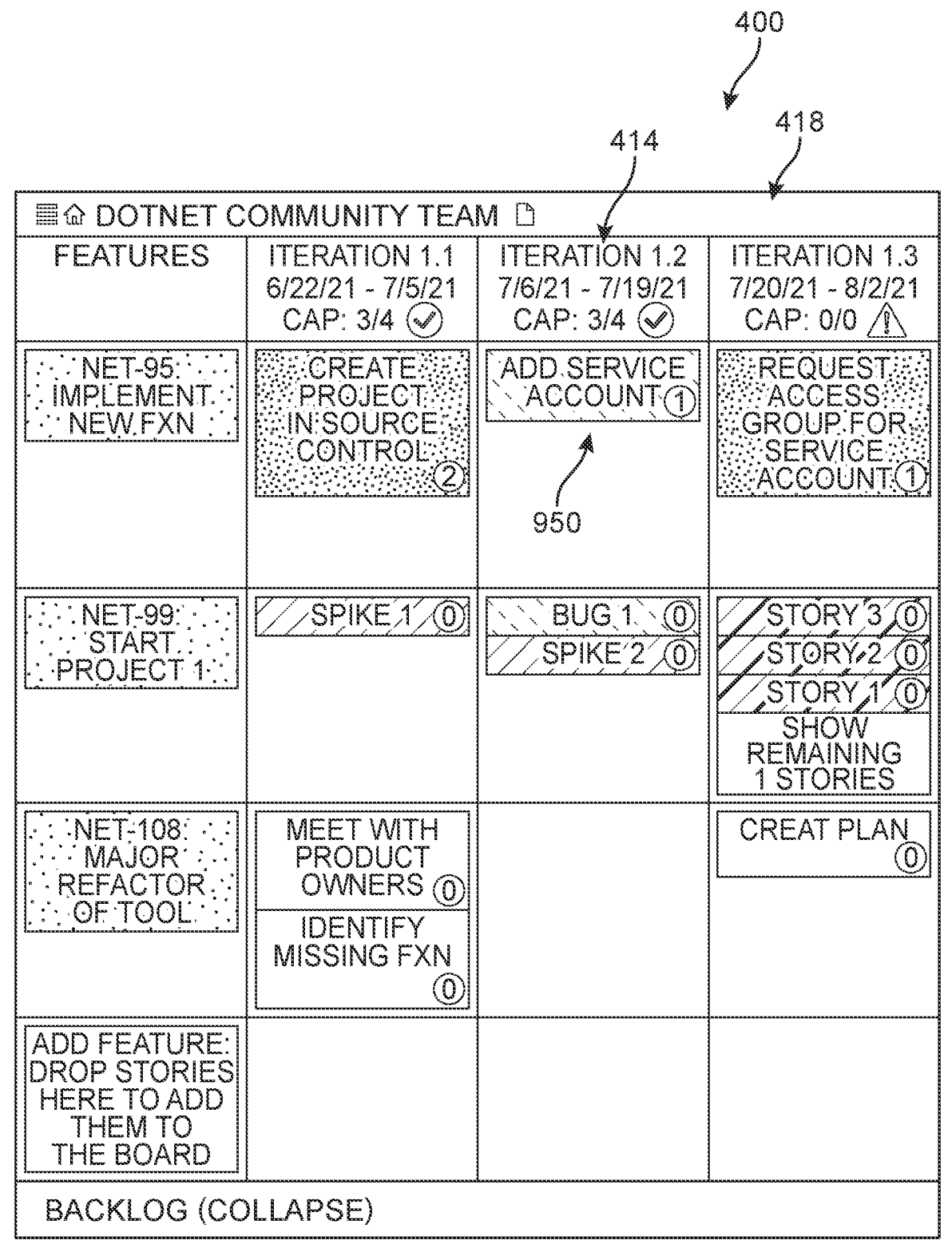

Returning to the secondary app interface 400 in FIG. 9, which has been automatically updated via information from the primary app, the fifth issue 850 (see FIG. 8) has been added to the available issues. In one embodiment, because the fifth issue was linked to project NET-95, the system can automatically place a fourth card 950 representing the fifth issue into the lane associated with that project. In addition, because one of the labels added to this issue was "PI 1.2", the system can automatically insert the fourth card 950 into the appropriate column, which in this case is under third header 414 as Iteration 1.2.

It can be appreciated that the board 418 offers users a broad overview of the current issues and so each card is intentionally brief, showing only limited information. However, as shown in FIG. 10, each card may also be configured to serve as an interactive icon, whereby a hover by a cursor 1010 over a card can trigger presentation of a more comprehensive summary 1050 of the issue, including data for the content item as depicted in FIG. 7 and fields that may be empty.

Figure 11A:
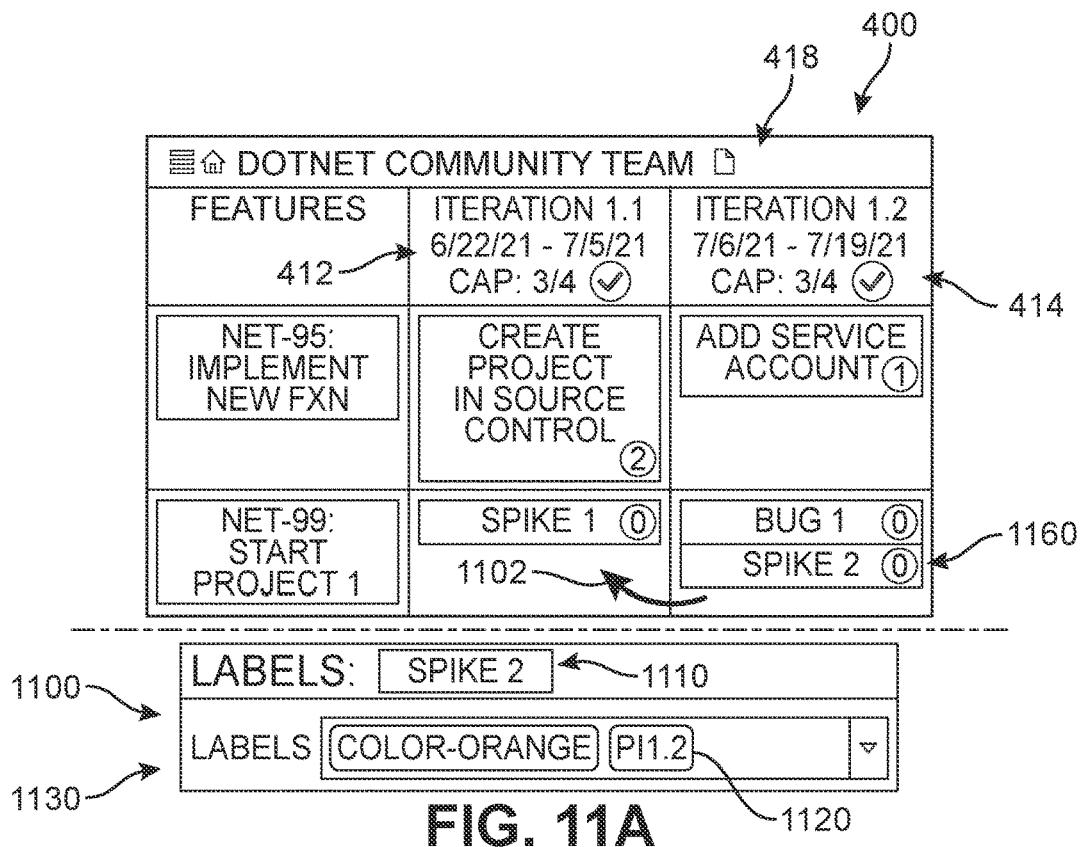
FIGS. 11A and 11B are an example of a propagation of a label change made in the secondary app back to the primary app, according to an embodiment.
Figure 11B:
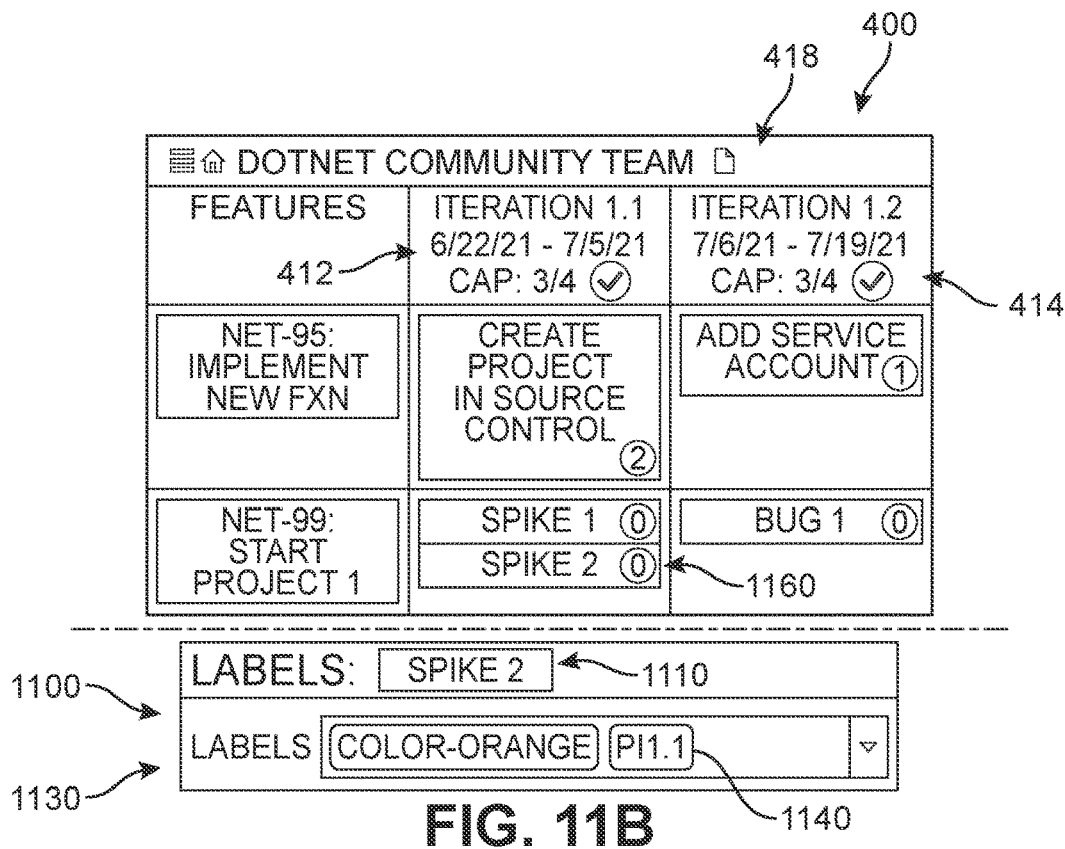

In different embodiments, the secondary app can include provisions for modifying labels or other non-substantive data in real-time. In FIGS. 11A and 11B, an abbreviated portion of the board 418 is shown in order to illustrate one possible manifestation of such a feature for the secondary app interface 400. In FIG. 11A, the original arrangement of cards is shown. More specifically, a fifth card 1160 ("Spike 1") is in a slot under the third header 414 (Iteration 1.2). Below a dotted line, a second label maker dialogue box 1100 from the primary app is shown to allow the reader to understand the correspondence between the current slot position of the fifth card 1160 with labels 1130 including a first label "PI 1.2" 1120 that was applied in the primary app for content item/issue "Spike 2" 1110. However, as represented by arrow 1102, the user of secondary app is now dragging and dropping the fifth card 1160 into the adjacent column under second header 412 (Iteration 1.1) of the board 418 for secondary app. This is reflected in FIG. 11B, where the fifth card 1160 is now positioned under second header 412 (Iteration 1.1). In response, as data is propagated from secondary app back to the primary app, this change is automatically applied to labels 1130 stored in the source data. Thus, labels 1130 now include a second label 1140 "PI 1.1" and the first label "PI 1.1" has been removed.

Figure 12A:
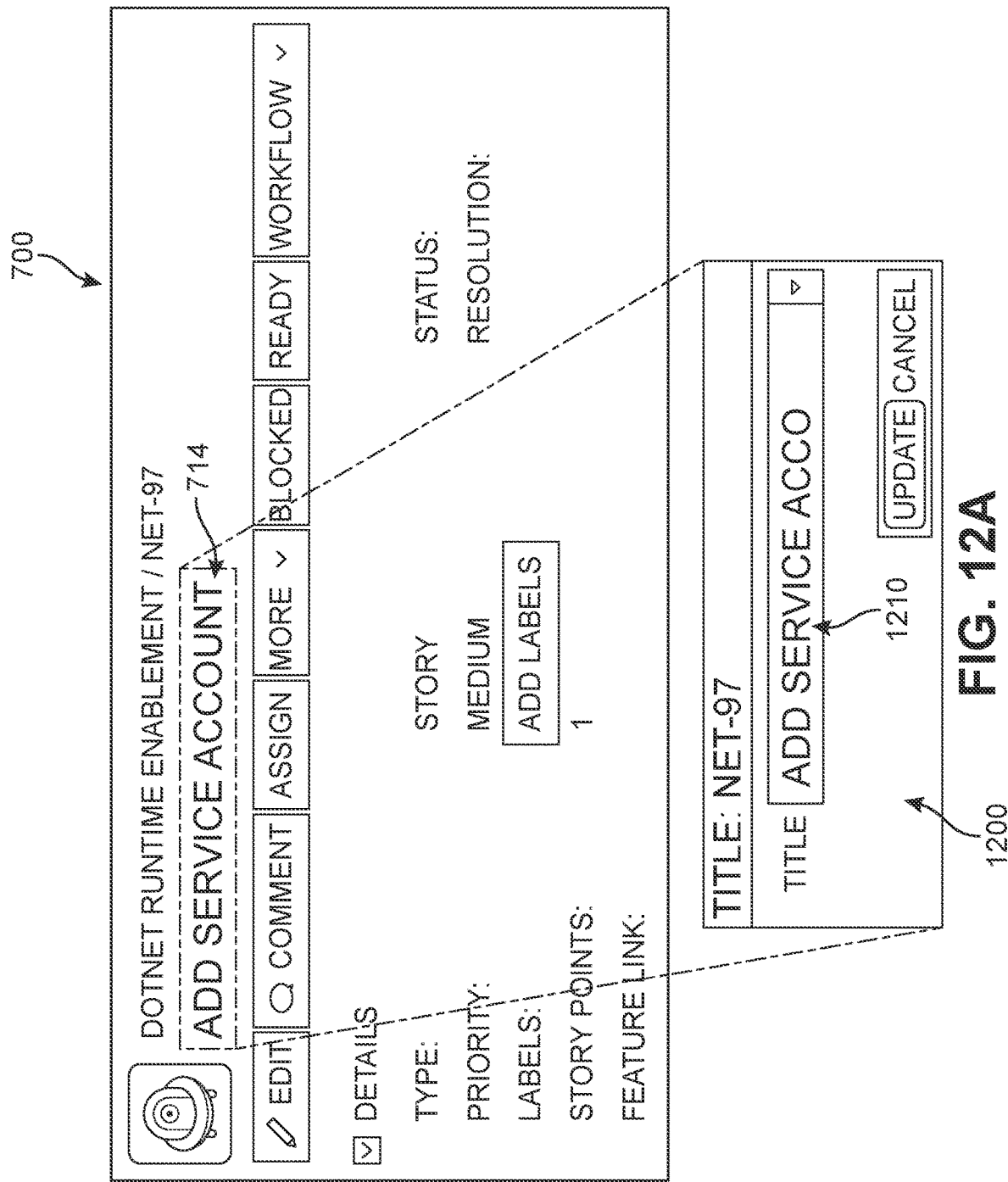
Figure 12B:
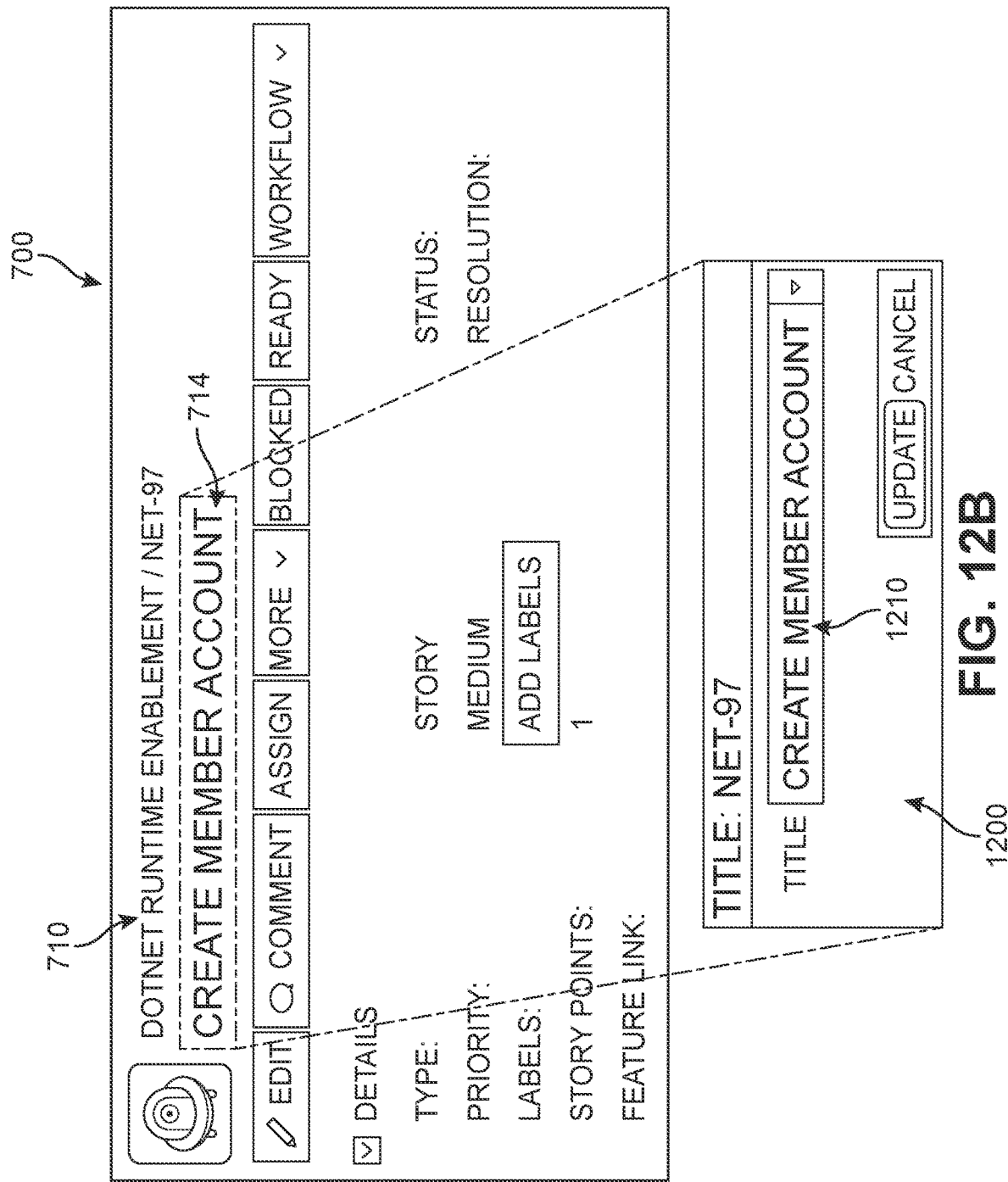

In contrast, as shown in FIGS. 12A-12C, in order to make changes to substantive data of a content item, the user must return to the primary app. In FIG. 12A, an abbreviated portion of the primary app's content generation interface 700 is shown, where title 714 "Add Service Account" is being accessed and modified via a title editor 1200. In this case, the title 714 is being changed via a text entry box 1210, and appears to be beginning to be deleted. In FIG. 12B, the "Add Service Account" name has been deleted, and replaced with "Create Service Account". Returning to the board 418 of secondary app in FIG. 12C, it can be seen that the change has been automatically propagated from primary app to secondary app, whereby fifth card 1160 now reads "Create Member Account". Thus, in different embodiments, substantive data changes that can be made via the primary app can be translated back to the secondary app in real-time or near-real-time. Thus, the information will be updated based on user activity and updates will be immediately available to users, whether such inputs occur via the primary app or the secondary app, creating a highly adaptive environment.

Figure 13:
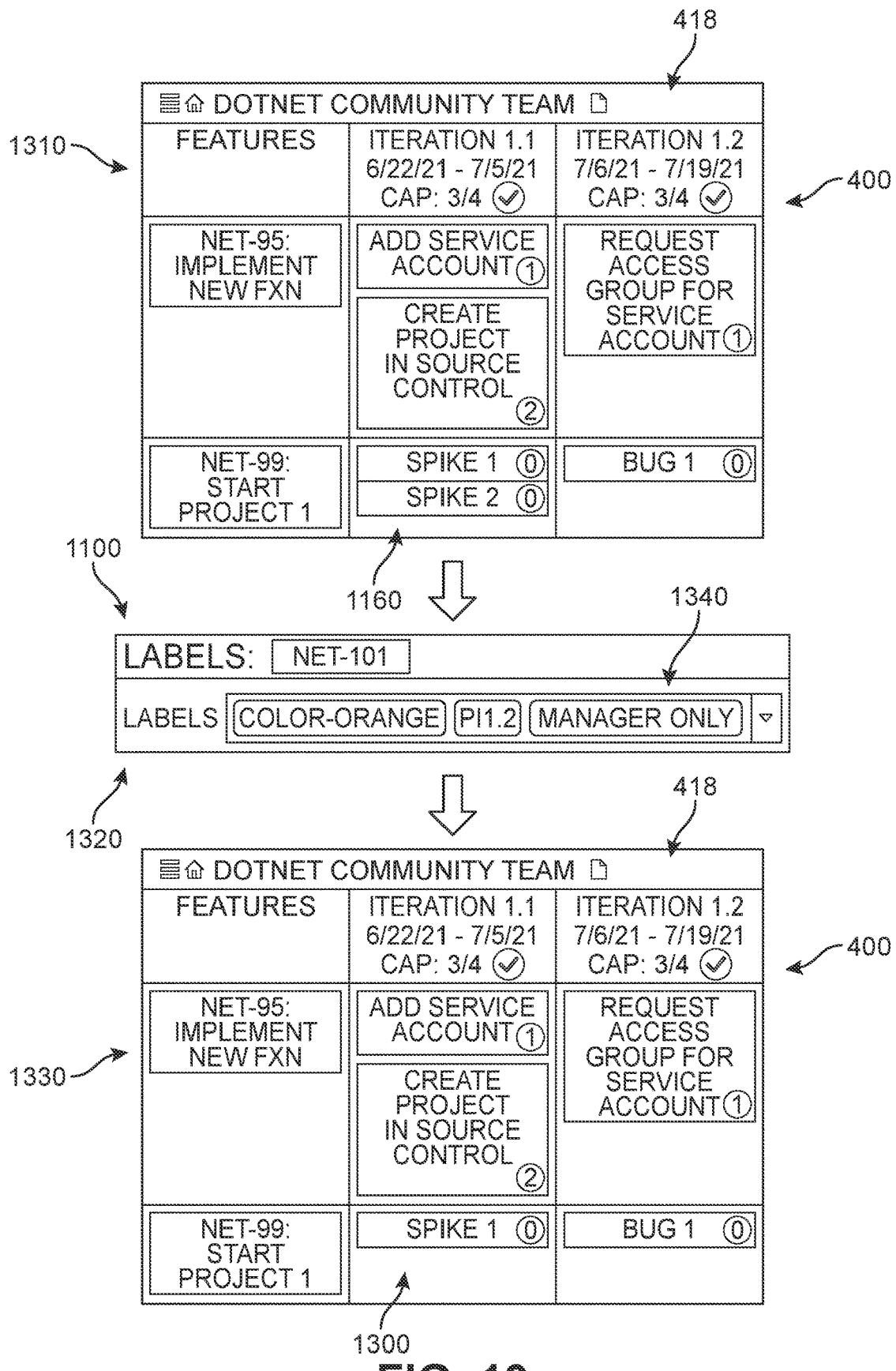
FIG. 13 is an example of a security restriction policy being enabled in response to the addition of a particular label to a content item, according to an embodiment.

Furthermore, as noted earlier, the system can include provisions for protecting the confidentiality of some content items. In FIG. 13, an abbreviated portion of the board 418 is shown in order to illustrate one possible manifestation of such a feature for the secondary app interface 400. In a first stage 1310, the board 418 includes the full set of cards as depicted in earlier drawings. However, in a second stage 1320, the second label maker dialogue box 1100 is accessed, allowing a user to request that the asset be hidden from certain users or groups. In this case, a third label 1340 "Manager Only" has been added. In response, the secondary app automatically and immediately causes the board 418 to hide the fifth card in access sessions in which the current user is a non-manager, such that slot 1300 (where the fifth card had been located) is empty.

The proposed systems and methods allow data managers and other users significantly greater flexibility in their interaction with source data. In different embodiments, some or all substantive data exported from primary app to secondary app may be freely browsed, downloaded, modified, and/or altered, and these changes will blocked from being propagated back to the primary app in order to ensure data integrity at the source. In other embodiments, no changes may be permitted to substantive data in the secondary app and only presentation-based configuration policies may be affected as described herein. In another example, a user may make changes to various data for a content item in the secondary app, and these changes can be conveyed as an email or other message to members of the team, or a supervisor for the project, to request that such changes be performed in the primary app. In another embodiment, rather than an email, a message may be generated for presentation by the primary app the next time that someone with editorial rights accesses the first content item via primary app.

Figure 14:
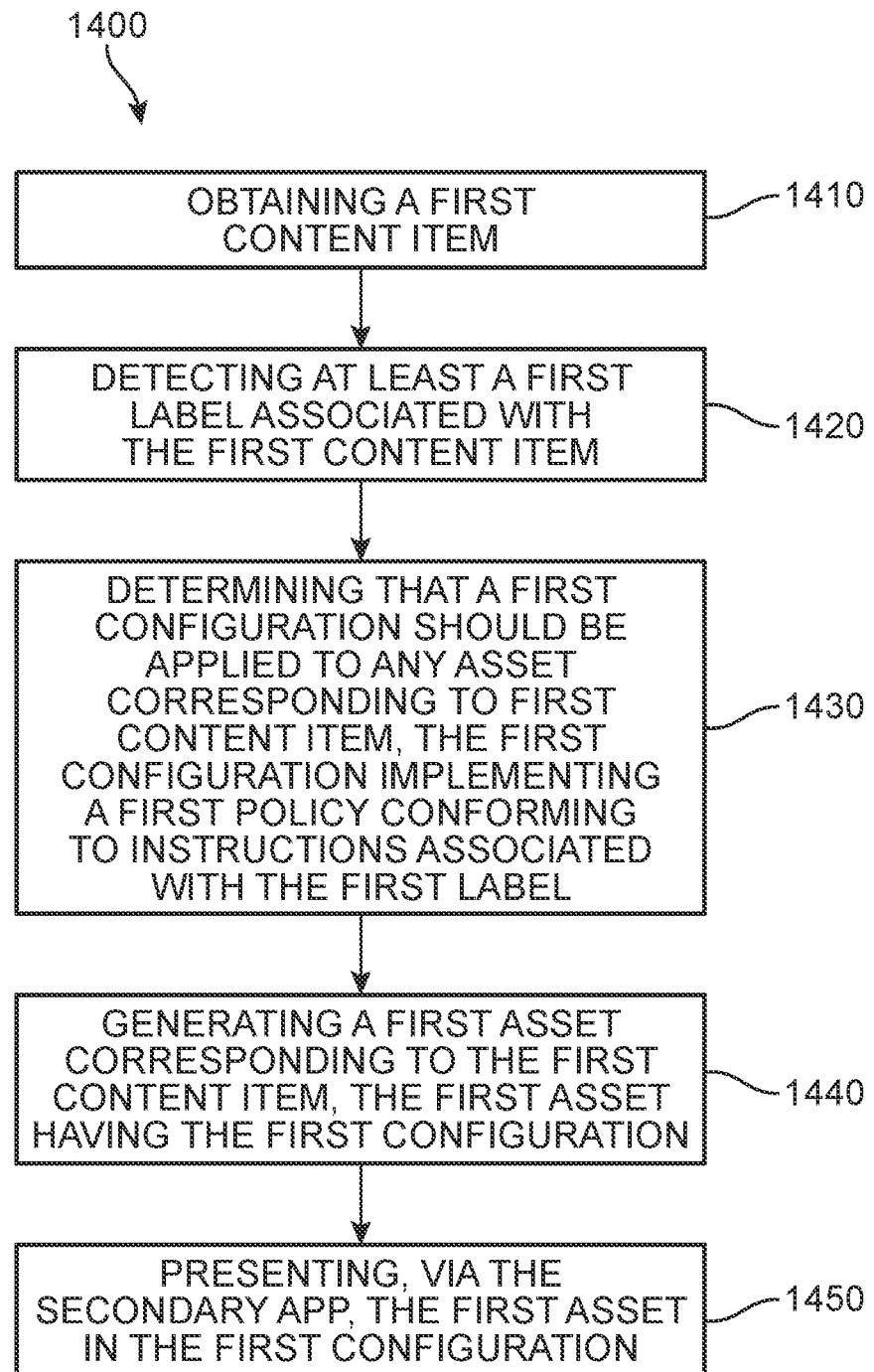
FIG. 14 is a flow diagram of a process for customizing a configuration of a content item in a secondary app, according to an embodiment.

FIG. 14 is a flow chart illustrating an embodiment of a computer-implemented method 1400 of customizing a configuration of a content item in a secondary app. The method includes a first step 1410 of obtaining, from a primary app and at the secondary app, a first content item, and a second step 1420 of detecting, at the secondary app, at least a first label associated with the first content item. In addition, a third step 1430 includes determining, at the secondary app and based on the first label, that a first configuration should be applied to any asset corresponding to first content item. In such cases, the first configuration implements a first policy conforming to instructions associated with the first label. The method 1400 further includes a fourth step 1440 of generating, at the secondary app, a first asset corresponding to the first content item, the first asset having the first configuration, and a fifth step 1450 of presenting, via the secondary app, the first asset in the first configuration.

In other embodiments, the method may include additional steps or aspects. In one embodiment, the method further includes steps of receiving, at the primary app, a request to add a second label to the first content item, adding, at the primary app, the second label to the first content item, propagating, from the primary app to the secondary app, an updated first content item including both the first label and the second label, switching, at the secondary app, from the first configuration to a second configuration with respect to the first content item, the second configuration mode implementing a second policy conforming to instructions associated with both the first label and the second label, and presenting, via the secondary app, the first asset in the second configuration.

In another example, the method also includes steps of receiving, at the primary app, a request to remove the second label from the first content item, removing, at the primary app, the second label from the first content item, propagating, from the primary app to the secondary app, an updated first content item excluding the second label, switching, at the secondary app, from the second configuration to the first configuration with respect to the first content item, and presenting, via the secondary app, the first asset in the first configuration. In some embodiments, the first policy includes instructions to present the first asset in one of a specific color, shape, format, size, position, and template based on the first label.

In another embodiment, the method also includes steps of obtaining, from the primary app and at the secondary app, a first set of content items including the first content item, and presenting, at the secondary app, a panel including a listing of one or more content items of the first set. In such cases, the method may in some embodiments, also include a step of presenting, at the secondary app, a prepopulated grid based on the obtained plurality of content items, where the prepopulated grid includes headers related to planning stages for a project associated with the content items of the first set. In some embodiments, the first content item is presented as a selectable option in the panel which may be dragged-and-dropped to a position on the grid, and in one embodiment the operation of dropping the first content item into the grid causes the first configuration to be implemented.

Other methods can also be contemplated within the scope of this disclosure. For example, a computer-implemented method of accessing data stored in a primary app via a secondary app in order to protect the integrity of the data is disclosed. The method includes a first step of obtaining, from the primary app and at the secondary app, a first content item, a second step of receiving, at the secondary app, a first request to modify the first content item, a third step of determining the modification involves non-substantive data for the first content item, a fourth step of modifying, at the secondary app, the first content item, and a fifth step of propagating the modification back to the primary app such that a record for the first content item at the primary app is updated to reflect the modification.

In different embodiments, this method may include additional steps or aspects. In one embodiment, the method includes steps of obtaining, from the primary app and at the secondary app, a first content item, receiving, at the secondary app, a first request to modify the first content item, determining the modification only involves non-substantive data for the first content item (i.e., that the modification does not involve substantive data), modifying, at the secondary app, the first content item, and propagating the modification back to the primary app such that a record for the first content item at the primary app is updated to reflect the modification, based on the determination.

In some embodiments, the method may further include steps of obtaining, from the primary app and at the secondary app, a second content item, receiving, at the secondary app, a second request to modify the second content item, determining, at the secondary app, that the modification involves substantive data for the second content item, and rejecting, at the secondary app, the second request. In another example, the method can also include a step of detecting, at the secondary app, at least a first label associated with the first content item, where the modification is a replacement of the first label with a second label. In some embodiments, the method also includes a step of detecting, at the secondary app, at least a first label associated with the first content item, where the modification is an association of a second label with the first content item. In one example, the method includes steps of obtaining, from the primary app and at the secondary app, an update for the first content item, and causing, in response to obtaining the update, a change in substantive data for the first content item in the secondary app. In some embodiments, the second request is generated in the secondary app in response to a user input attempting to move a first asset corresponding to the first content item from a first position associated with a first project to a second position associated with a different, second project. In some examples, the method also includes steps of generating, via the secondary app, a first asset corresponding to the first content item, and presenting, via the secondary app, the first asset with a first configuration, where the inclusion of the second label causes a change in configuration of the first asset from the first configuration to a second configuration.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random-access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of customizing a configuration of a content item in a secondary app, the method comprising:
   obtaining, from a primary app and at the secondary app, a first content item;
   detecting, at the secondary app, at least a first label associated with the first content item;
   determining, at the secondary app and based on the first label, that a first configuration should be applied to any asset corresponding to first content item, the first configuration implementing a first policy conforming to instructions associated with the first label;
   generating, at the secondary app, a first asset corresponding to the first content item, the first asset having the first configuration;
   presenting, via the secondary app, the first asset in the first configuration;
   receiving, at the primary app, a request to add a second label to the first content item;
   adding, at the primary app, the second label to the first content item;
propagating, from the primary app to the secondary app, an updated first content item including both the first label and the second label;
switching, at the secondary app, from the first configuration to a second configuration with respect to the first content item, the second configuration mode implementing a second policy conforming to instructions associated with both the first label and the second label;

presenting, via the secondary app, the first asset in the second configuration;

receiving, at the primary app, a request to remove the second label from the first content item;

removing, at the primary app, the second label from the first content item;

propagating, from the primary app to the secondary app, an updated first content item excluding the second label;

switching, at the secondary app, from the second configuration to the first configuration with respect to the first content item; and presenting, via the secondary app, the first asset in the first configuration.

2. The method of claim 1, wherein the first policy includes instructions to present the first asset in one of a specific color, shape, format, size, position, and template based on the first label.

3. The method of claim 1, further comprising:
obtaining, from the primary app and at the secondary app, a first set of content items including the first content item; and
presenting, at the secondary app, a panel including a listing of one or more content items of the first set.

4. The method of claim 3, further comprising:
presenting, at the secondary app, a prepopulated grid based on the obtained plurality of content items, the prepopulated grid including headers related to planning stages for a project associated with the content items of the first set.

5. The method of claim 4, wherein the first content item is presented as a selectable option in the panel which may be dragged-and-dropped to a position on the grid.

6. The method of claim 5, wherein the operation of dropping the first content item into the grid causes the first configuration to be implemented.

7. The method of claim 1, further comprising:
receiving, at the secondary app, a first request to modify the first content item;
determining the modification involves non-substantive data for the first content item;
modifying, at the secondary app, the first content item; and
propagating the modification back to the primary app such that a record for the first content item at the primary app is updated to reflect the modification.

8. The method of claim 7, further comprising:
obtaining, from the primary app and at the secondary app, a second content item;
receiving, at the secondary app, a second request to modify the second content item;
determining, at the secondary app, that the modification involves substantive data for the second content item; and
rejecting, at the secondary app, the second request.

9. The method of claim 8, wherein the second request is generated in the secondary app in response to a user input attempting to move a first asset corresponding to the first content item from a first position associated with a first project to a second position associated with a different, second project.

10. The method of claim 7, further comprising detecting, at the secondary app, at least a first label associated with the first content item, wherein the modification is a replacement of the first label with a second label.

11. The method of claim 7, further comprising detecting, at the secondary app, at least a first label associated with the first content item, wherein the modification is an association of a second label with the first content item.

12. The method of claim 11, further comprising:
generating, via the secondary app, a first asset corresponding to the first content item;
presenting, via the secondary app, the first asset with a first configuration, and wherein the inclusion of the second label causes a change in configuration of the first asset from the first configuration to a second configuration.

13. The method of claim 7, further comprising:
obtaining, from the primary app and at the secondary app, an update for the first content item; and
causing, in response to obtaining the update, a change in substantive data for the first content item in the secondary app.

14. A system for customizing a configuration of a content item in a secondary app, the system comprising a processor and machine-readable media including instructions which, when executed by the processor, cause the processor to:
obtain, from a primary app and at the secondary app, a first content item;
detect, at the secondary app, at least a first label associated with the first content item;
determine, at the secondary app and based on the first label, that a first configuration should be applied to any asset corresponding to first content item, the first configuration implementing a first policy conforming to instructions associated with the first label;
generate, at the secondary app, a first asset corresponding to the first content item, the first asset having the first configuration;
present, via the secondary app, the first asset in the first configuration;
receive, at the primary app, a request to add a second label to the first content item;
add, at the primary app, the second label to the first content item;
propagate, from the primary app to the secondary app, an updated first content item including both the first label and the second label;
switch, at the secondary app, from the first configuration to a second configuration with respect to the first content item, the second configuration mode implementing a second policy conforming to instructions associated with both the first label and the second label;
present, via the secondary app, the first asset in the second configuration;
receive, at the primary app, a request to remove the second label from the first content item;
remove, at the primary app, the second label from the first content item;
propagate, from the primary app to the secondary app, an updated first content item excluding the second label;
switch, at the secondary app, from the second configuration to the first configuration with respect to the first content item; and
present, via the secondary app, the first asset in the first configuration.

15. The system of claim 14, wherein the first policy includes instructions to present the first asset in one of a specific color, shape, format, size, position, and template based on the first label.

16. The system of claim 14, wherein the instructions further cause the processor to:

obtain, from the primary app and at the secondary app, a first set of content items including the first content item; and present, at the secondary app, a panel including a listing of one or more content items of the first set.

17. The system of claim 16, wherein the instructions further cause the processor to present, at the secondary app, a prepopulated grid based on the obtained plurality of content items, the prepopulated grid including headers related to planning stages for a project associated with the content items of the first set.

18. The system of claim 17, wherein the first content item is presented as a selectable option in the panel which may be dragged-and-dropped to a position on the grid.

19. The system of claim 18, wherein the operation of dropping the first content item into the grid causes the first configuration to be implemented.

20. The system of claim 14, wherein the instructions further cause the processor to:

receive, at the secondary app, a first request to modify the first content item;

determine the modification involves non-substantive data for the first content item;

modify, at the secondary app, the first content item; and propagate the modification back to the primary app such that a record for the first content item at the primary app is updated to reflect the modification.

* * * * *